(12) United States Patent
Koyama et al.

(10) Patent No.: US 7,680,013 B2
(45) Date of Patent: Mar. 16, 2010

(54) OPTICAL INFORMATION RECORDING AND REPRODUCING APPARATUS

(75) Inventors: Osamu Koyama, Hachioji (JP); Osamu Nagatsuka, Kawasaki (JP); Shinnosuki Torii, Kawasaki (JP); Koichiro Nishikawa, Takasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 11/562,575

(22) Filed: Nov. 22, 2006

(65) Prior Publication Data

US 2007/0121468 A1    May 31, 2007

(30) Foreign Application Priority Data

| Nov. 29, 2005 | (JP) | ................................ 2005-343882 |
| Nov. 29, 2005 | (JP) | ................................ 2005-343884 |
| May 10, 2006 | (JP) | ................................ 2006-131450 |
| Nov. 14, 2006 | (JP) | ................................ 2006-307896 |

(51) Int. Cl.
    *G11B 7/00* (2006.01)
(52) U.S. Cl. ...................................... 369/103
(58) Field of Classification Search ................ 369/103, 369/44.12, 112.01, 112.02, 112.1; 359/3, 359/22, 238
    See application file for complete search history.

(56) References Cited

U.S. PATENT DOCUMENTS

| 4,803,579 | A | 2/1989 | Koyama ...................... 360/114 |
| 4,813,032 | A | 3/1989 | Koyama ........................ 369/13 |
| 4,953,124 | A | 8/1990 | Koyama ...................... 365/122 |
| 5,029,261 | A | 7/1991 | Koyama et al. .......... 250/201.5 |
| 5,039,202 | A | 8/1991 | Koyama et al. ............. 359/823 |
| 5,231,621 | A | 7/1993 | Matsui et al. ............. 369/44.32 |
| 5,293,371 | A | 3/1994 | Koyama ...................... 369/110 |
| 5,293,569 | A | 3/1994 | Koyama ...................... 369/112 |
| 5,347,503 | A | 9/1994 | Koyama et al. .......... 369/44.32 |
| 5,353,275 | A | 10/1994 | Nishikawa .................... 369/121 |
| 5,404,346 | A | 4/1995 | Koyama et al. .......... 369/44.32 |
| 5,463,610 | A | 10/1995 | Nishikawa .................... 369/121 |
| 5,517,475 | A | 5/1996 | Koyama et al. .......... 369/44.32 |
| 5,517,480 | A | 5/1996 | Matsuoka et al. ........... 369/110 |
| 5,528,576 | A | 6/1996 | Nishikawa .................... 369/112 |
| 5,532,990 | A | 7/1996 | Koyama et al. .......... 369/44.32 |
| 5,546,373 | A | 8/1996 | Koyama ...................... 369/120 |
| 5,557,601 | A | 9/1996 | Nishikawa .................... 369/121 |
| 5,586,097 | A | 12/1996 | Nishikawa .................... 369/112 |
| 5,608,716 | A | 3/1997 | Koyama et al. ......... 369/275.1 |
| 5,657,305 | A | 8/1997 | Sasaki et al. ................ 369/110 |

(Continued)

*Primary Examiner*—Nabil Z Hindi
(74) *Attorney, Agent, or Firm*—Fitzpatrick, Cella, Harper & Scinto

(57) ABSTRACT

Provided is a spatial light modulator SLM and a photodetector element CMOS sensor are placed on the same chip, and the alignment thereof and a relay lens system are eliminated, whereby an optical system is reduced in cost and made compact. Specifically, provided is an optical information recording and reproducing apparatus for recording information by allowing information light and reference light to interfere with each other and reproducing the information using the reference light including: a light source; a spatial light modulator for generating at least an information light with respect to a light beam from the light source; an objective lens for irradiating a recording medium with the light beam from the spatial light modulator; and a photodetector element for receiving a reproduction light from the recording medium, in which the spatial light modulator and the photodetector element are formed on the same semiconductor substrate.

11 Claims, 36 Drawing Sheets

U.S. PATENT DOCUMENTS

| | | | |
|---|---|---|---|
| 5,745,449 A | 4/1998 | Koyama | 369/44.32 |
| 5,995,472 A | 11/1999 | Fujii et al. | 369/110 |
| 6,031,810 A | 2/2000 | Nishikawa | 369/121 |
| 6,141,302 A | 10/2000 | Koyama et al. | 369/44.24 |
| 6,282,165 B1 | 8/2001 | Koyama et al. | 369/118 |
| 6,298,015 B1 | 10/2001 | Ishii et al. | 369/13 |
| 6,411,596 B1 | 6/2002 | Nagatsuka | 369/291 |
| 6,418,109 B2 | 7/2002 | Koyama et al. | 369/118 |
| 6,901,599 B2 | 5/2005 | Nagatsuka | 720/675 |
| 6,909,673 B2 | 6/2005 | Ishii et al. | 369/13.12 |
| 6,950,217 B2 * | 9/2005 | Richards | 359/238 |
| 7,106,663 B2 | 9/2006 | Nagatsuka | 369/13.11 |
| 7,236,442 B2 * | 6/2007 | Sugiki et al. | 369/103 |
| 2005/0081228 A1 | 4/2005 | Torii | 720/704 |
| 2005/0122860 A1 | 6/2005 | Koyama | 369/44.32 |
| 2005/0157608 A1 | 7/2005 | Nagatsuka | 369/44.14 |
| 2005/0163000 A1 | 7/2005 | Nishikawa | 369/44.37 |
| 2006/0187786 A1 | 8/2006 | Torii | 369/47.54 |
| 2006/0256686 A1 | 11/2006 | Torii | 369/53.37 |
| 2006/0262705 A1 | 11/2006 | Koyama | 369/112.01 |
| 2007/0086288 A1 | 4/2007 | Torii | 369/44.23 |
| 2007/0121469 A1 | 5/2007 | Torii | 369/112.01 |

* cited by examiner

OPTICAL INFORMATION RECORDING AND REPRODUCING APPARATUS

BACKGROUND OF THE INVENTION

1. Field of the Invention

The present invention relates to an optical information recording and reproducing apparatus, and more particularly, to an optical information recording and reproducing apparatus for recording information with respect to a recording medium on which information is recorded using holography, and for reproducing information from the recording medium having information recorded thereon.

2. Description of the Related Art

FIG. 39 is a block diagram showing an optical system of a conventional coaxial type (collinear type) holographic memory.

First, a description is given on a case where information recording is performed with respect to a hologram disk 216 serving as a recording medium.

A light beam outputted from a green laser 201 of a light source is collimated by a collimator 202, and irradiates a spatial light modulator SLM 204 via a mirror 203.

In FIG. 39, a deformable mirror device (DMD) is used for the SLM 204.

Light reflected by a pixel representing the information "1" on the SLM 204 is reflected to the hologram disk 216, and light reflected by a pixel representing the information "0" is not reflected to the hologram disk 216.

Provided on the collinear SLM 204 are a portion for modulating an information light 206 and a portion for modulating a reference light 205 surrounding the information light 206 in an annular shape.

The reference light 205 and the information light 206 reflected by the pixel representing the information "1" on the SLM 204 are transmitted through a polarizing beam splitter PBS 207 as P-polarized light. After that, the reference light 205 and the information light 206 become incident upon the hologram disk 216 via a relay lens (1) 208, a mirror 209, a relay lens (2) 210, and a dichroic BS 211.

The reference light 205 and the information light 206 transmitted through a quarter wavelength plate QWP 212 and converted to circular polarized light (e.g., clockwise circular polarized light) are reflected by a mirror 213 to be incident upon an objective lens 214 with a focal distance f.

A pattern displayed on the SLM 204 by two relay lenses (1) and (2) forms an intermediate image at a distance f before the objective lens 214.

Thus, a so-called 4f optical system is configured, in which a pattern image (not shown) on the SLM, the objective lens 214, and the hologram disk 216 are placed with an interval f from each other.

The hologram disk 216 has a disk shape and is rotatably held on a spindle motor 215.

The reference light 205 and the information light 206 are condensed onto a recording medium (not shown) on the disk by the objective lens 214 and interfere with each other to form an interference fringe.

On a polymer material in a recording medium, an interference fringe pattern during this recording is recorded as a refractive index distribution, and a digital volume hologram is formed. Further, in the recording medium, a reflective film is provided.

A red laser 220 which has no effect on the photosensitivity of the recording medium is provided, in addition to a green laser 201 for performing recording and reproduction with respect to a hologram, whereby a displacement of the hologram disk 216 can be detected with high precision, with the above-mentioned reflective film being a reference surface.

As a result, even when axial deflection and radial runout occur in the hologram disk 216, a recording spot can be allowed to follow the recording medium surface dynamically using an optical servo technique, and an interference fringe pattern can be recorded with high precision.

The above-mentioned aspect will be described briefly below.

A linear polarized light beam outputted from the red laser 220 is transmitted through a beam splitter BS 221, and collimated by a lens 222. After that, the light beam is reflected by a mirror 223 and the dichroic BS 211, and travels to the hologram disk 216.

The light beam transmitted through the quarter wavelength plate QWP 212 and converted into circular polarized light (e.g., clockwise circular polarized light) is reflected by the mirror 213 to be incident upon the objective lens 214. After that, the light beam is condensed as a minute optical spot on a reflective surface of the hologram disk 216.

The reflected light beam becomes reverse circular polarized light (e.g., counterclockwise circular polarized light), and is incident upon the objective lens 214 again to be collimated. After that, the collimated light beam is reflected by the mirror 213, transmitted through the quarter wavelength plate QWP 212, and converted into a linear polarized light beam perpendicular to a forward path.

The light beam reflected by the dichroic BS 211 passes through the mirror 223 and the lens 222 in the same way as in the forward path, and is reflected by the beam splitter BS 221 to be guided to a photodetector 224.

The photodetector 224 has a plurality of light receiving surfaces (not shown) and can detect positional information on a reflective surface by a known method. Based on the detected positional information, the photodetector 224 can perform focusing and tracking of the objective lens 214.

Next, a case where recorded information is reproduced from the hologram disk 216 serving as a recording medium by using the above-mentioned optical system will be described.

The light beam outputted from the green laser 201 of a light source irradiates the spatial light modulator SLM 204 in the same way as in recording. During reproduction, only a portion modulating the reference light 205 on the SLM 204 represents the information "1", and a portion modulating the information light 206 displays information "0".

Thus, only a part of the reference light reflected by a pixel is reflected to the hologram 216, and the information light is not reflected to the hologram 216.

In the same way as in recording, the reference light 205 becomes circular polarized light (e.g., clockwise circular polarized light) to be condensed onto a recording medium (not shown) on a disk, and reproduces information light from the recorded inference fringe. The information light reflected by the reflective film in the recording medium becomes reverse circular polarized light (e.g., counterclockwise circular polarized light), and becomes incident upon the objective lens 214 again to be collimated. After that, the collimated light is reflected by the mirror 213, transmitted through the quarter wavelength plate QWP 212, and converted into a linear polarized light beam (S-polarized light) perpendicular to the forward path. At this time, an intermediate image of a display pattern of SLM reproduced at a distance f from the objective lens 214 is formed.

The light beam transmitted through the dichroic BS 211 is directed to the polarizing beam splitter PBS 207 via the relay lens (2) 210, the mirror 209, and the relay lens (1) 208.

The light beam reflected by the PBS forms an image again as an intermediate image of a display pattern of SLM at a position conjugate to the spatial light modulator SLM 204 by the relay lenses (2) and (1).

At this position, an aperture 217 is previously placed, and unnecessary reference light in the periphery of the information light is blocked. Through the lens 218, the re-formed intermediate image forms an SLM display pattern only of a portion of the information light on a complementary metal oxide semiconductor (CMOS) sensor 219. Consequently, unnecessary reference light is not incident upon the CMOS sensor 219, so a reproduced signal with a satisfactory S/N can be obtained.

Regarding the above-mentioned technology, the following document is referred to: "Measurement and Nano-control Technology Supporting Holographic Memory/HVD™" (Proceeding of 35th Meeting on Lightwave Sensing Technology (LST35-12) June, 2005, Shochi Tan and Hideyoshi Horigome).

As described above, in the collinear holographic memory, information light and reference light can perform recording and reproduction in the coaxial optical arrangement having no angles, using one objective lens. Therefore, compared with a two-axis two-light beam interference system, an optical system is simplified.

Further, owing to the medium configuration with a reflective film, an optical system can be arranged on one side of a disk.

However, it is necessary to align the shift, tilt, and rotation of the two-dimensional spatial light modulator SLM 204 and the CMOS sensor 219 with high precision, which makes it difficult to decrease cost.

Further, a relay lens system used for an optical system projects the pattern of the spatial light modulator SLM 204 onto the CMOS sensor 219 exactly, so an expensive lens with a reduced distortion aberration and a reduced field curvature is required.

On the other hand, as another holographic memory, there is a system of recording a hologram on a recording medium by allowing two light beams to interfere with each other, as shown in FIGS. 40A and 40B.

FIGS. 40A and 40B show systems at a time of recording and reproduction, respectively.

During recording, a light beam is divided into two light beams by a beam splitter (BS) 401. One of the light beams is allowed to be incident upon a recording medium 404 at a predetermined angle via a galvanometer mirror 402 and relay lenses 403 as reference light, and the other light beam divided by the BS 401 is modulated to a two-dimensional pattern in accordance with information by a spatial light modulator SLM 405 to be incident upon the recording medium 404 by an objective lens 406 as information light. Thus, the two-dimensional pattern modulated by the SLM 405 is formed on the recording medium 404 as an interference pattern, and recorded thereon. Then, the incident angle with respect to the recording medium 404 is changed by the galvanometer mirror 402, whereby multi-recording in accordance with the angle is performed.

During reproduction, a light beam traveling to the SLM 405 and the objective lens 406 is blocked, and the recording medium 404 is irradiated with only the above-mentioned reference light at a predetermined angle, whereby a diffracted light by a hologram formed in the previous recording is generated. The diffracted light is condensed by an objective lens 407 for detection to form an image on a CMOS sensor 408, and the information on the two-dimensional pattern formed by the SLM 405 during recording is reproduced.

However, according to the above-mentioned configuration, an optical system and the like are arranged on both sides of a recording medium, so there is a problem that an apparatus is enlarged. In order to solve the problem, an apparatus in which an optical system and the like are arranged on one side of the recording medium has been proposed so as to miniaturize the apparatus.

An example thereof is described in 2006 Optical Data Storage Topical Meeting Conference Proceedings MA1 "The InPhase Professional Archive Drive OMA: Design and Function" as shown in FIGS. 41A and 41B.

In the same way as the above, FIGS. 41A and 41B show apparatuses at a time of recording and reproduction, respectively.

First, the apparatus at a time of recording will be described.

Among light beams from a laser light source 411, a light beam transmitted through a polarizing beam splitter PBS 417 becomes reference light, and is reflected by a mirror 418, a mirror 419, and a galvanometer mirror 420 to be guided to scanning lenses 421. The scanning lenses 421 irradiate the guided reference light to a hologram recording medium 422.

Herein, an expander 412 adjusts a light beam diameter to a desired diameter. A pin-hole 413 is a spatial filter for adjusting a wavefront. A shutter 414 is prepared for the purpose of controlling the exposure time during recording. An apodizer 415 is a filter for making the intensity distribution of a light beam uniform in a plane. A half wavelength plate 416 can rotate variably, and changes the polarized direction of a light beam incident upon the PBS 417 during reproduction described later so as to prevent light transmitted through the PBS 417 from being generated.

On the other hand, among the light beams from the laser light source, a light beam reflected by the PBS 417 is reflected by a PBS 426 to be incident upon a reflection type liquid crystal device 427. The incident light beam has a polarized direction changed, and reflected while being two-dimensionally modulated in accordance with predetermined information to become information light. The generated information light is transmitted through the PBS 426, and is irradiated to a hologram recording medium 422 by an objective lens 431.

Herein, an expander 423 adjusts the diameter of a light beam to be information light. A phase mask 424 is a filter for eliminating the non-uniformity of an intensity distribution in the hologram recording medium on which the light beam is condensed by the objective lens. Relay lenses 425 superimpose a two-dimensional pattern image of the phase mask 424 on the reflection type liquid crystal device 427. The relay lens 428 forms a two-dimensional pattern image of the reflection type liquid crystal device 427 on which the two-dimensional pattern image of the phase mask 424 is superimposed on an incident side focal plane of the objective lens 431. A polytopic filter 429 is an aperture for restricting the mixing of reproducing light from outside of a desired hologram during hologram reproduction described later. A half wavelength plate 430 is capable of being switched, and is provided so as to change the polarized direction of a light beam from the hologram recording medium 422 during reproduction described later.

Next, the apparatus at a time of reproduction will be described.

During reproduction, the polarized direction of a light beam from the laser light source 411 is changed by the half wavelength plate 416, whereby the light beam is prevented from being reflected by the PBS 417. The light beam transmitted through the PBS 417 is reflected by the mirror 418, the mirror 419, and the galvanometer mirror 420, and guided to the scanning lenses 421 to be irradiated to the hologram recording medium 422 by the scanning lens. At this time, although a diffracted light by a hologram recorded on the hologram recording medium 422 is generated, the diffracted light is not used as information reproducing light.

The light beam transmitted through the hologram recording medium 422 is reflected by the galvanometer mirror 432, and becomes incident upon the hologram recording medium 422 as reference light. The incident angle of the reference light with respect to the hologram recording medium 422 is controlled by the galvanometer mirror 420 and the galvanometer mirror 432.

The reference light irradiated to the hologram recording medium 422 generates diffracted light by the hologram recorded on the hologram recording medium 422 to become information reproducing light. The information reproducing light is collected by the objective lens 431 and has its polarized direction changed by 90° by the half wavelength plate 430, and furthermore, is incident upon the PBS 426 under the condition that information reproducing light other than the light corresponding to the reference light incident angle controlled by the galvanometer mirror 420 and the galvanometer mirror 432 is removed by the polytopic filter 429. The light beam incident upon the PBS 426 has its polarized direction rotated by 90°, so it is reflected by the PBS 426 to be incident upon the CMOS sensor 433.

Thus, two-dimensional pattern information corresponding to a desired hologram recorded on the hologram recording medium 422 is reproduced.

As described above, an apparatus in which an optical system and the like are arranged on one side of a recording medium (only the galvanometer mirror 32 is placed on the opposite side) is realized.

However, the above-mentioned conventional example has the following problem.

That is, regarding the reflection type liquid crystal device 427 and the CMOS sensor 433, the relative shift, tilt, and rotation with respect to an optical axis are required to be aligned, which causes an increase in cost for adjusting an assembly. Further, the sizes of the reflection type liquid crystal device 427 and the CMOS sensor 433 are larger than those of a lens and the like that are the other constituent elements of the apparatus, which inhibits the miniaturization of the apparatus.

In view of the above-mentioned problems, it is an object of the present invention to alleviate the assembly adjustment precision regarding a spatial modulator and an image photodetector element and to further miniaturize an apparatus in a collinear system and a system to conduct recording by allowing two light beams to interfere with each other.

SUMMARY OF THE INVENTION

In view of the above, according to the present invention, a spatial light modulator SLM and a photodetector element CMOS sensor are placed on the same chip, and the alignment thereof and an expensive relay lens system are eliminated, whereby cost down and compacting of an optical system is achieved.

Specifically, there is provided an optical information recording and reproducing apparatus for recording information by allowing information light and reference light to interfere with each other and reproducing the information using the reference light, including:

a light source;

a spatial light modulator for generating at least an information light with respect to a light beam from the light source;

an objective lens for irradiating a recording medium with the light beam from the spatial light modulator; and a photodetector element for receiving a reproduction light from the recording medium, in which the spatial light modulator and the photodetector element are formed on a same semiconductor substrate.

Further features of the present invention will become apparent from the following description of exemplary embodiments with reference to the attached drawings.

DESCRIPTION OF THE EMBODIMENTS

Hereinafter, preferred embodiments for carrying out the present invention will be described with reference to the attached drawings.

Embodiment 1

FIGS. 1 to 7 illustrate Embodiment 1 of a collinear holographic memory optical system of the present invention.

Figure 1:
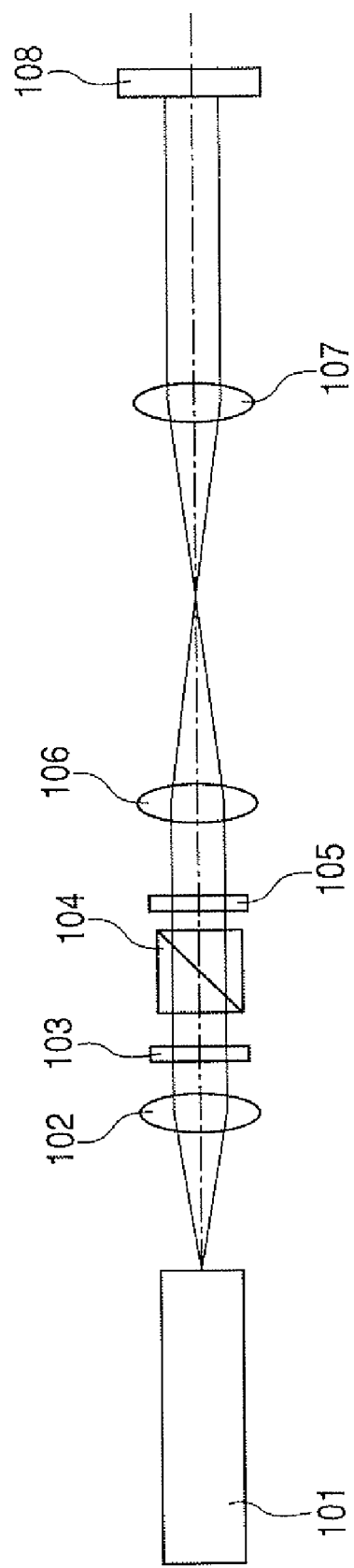
FIG. 1 is a block diagram showing an optical system from a light source to a spatial light modulating/photodetector element during recording.
Figure 2:
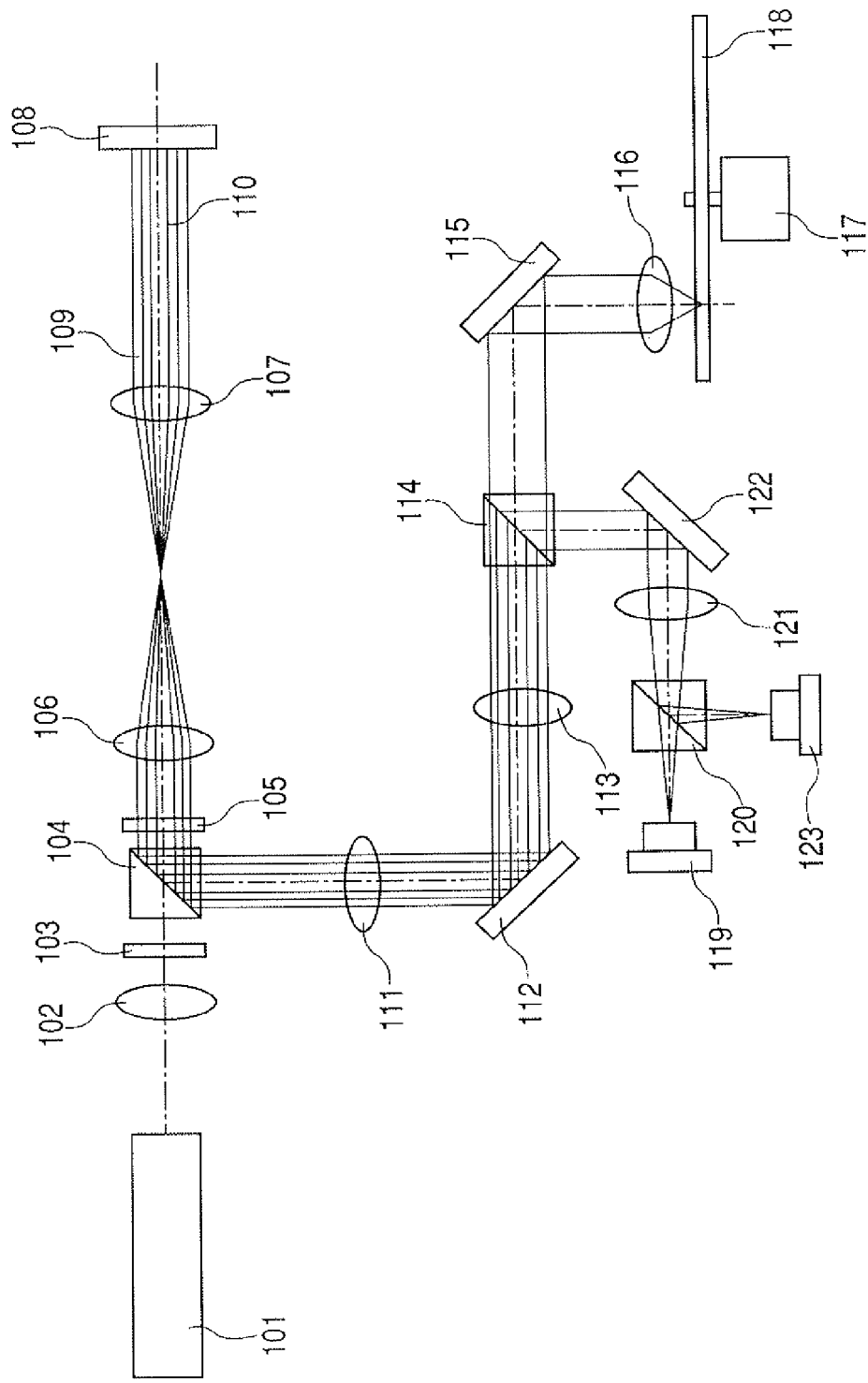
FIG. 2 is a block diagram showing an optical system from a spatial light modulating/photodetector element to a hologram disk during recording.

FIG. 1 is a block diagram showing an optical system from a light source to a spatial light modulating/photodetector element during recording, and FIG. 2 is a block diagram showing an optical system from a spatial light modulating/photodetector element to a hologram disk during recording.

Figure 3:
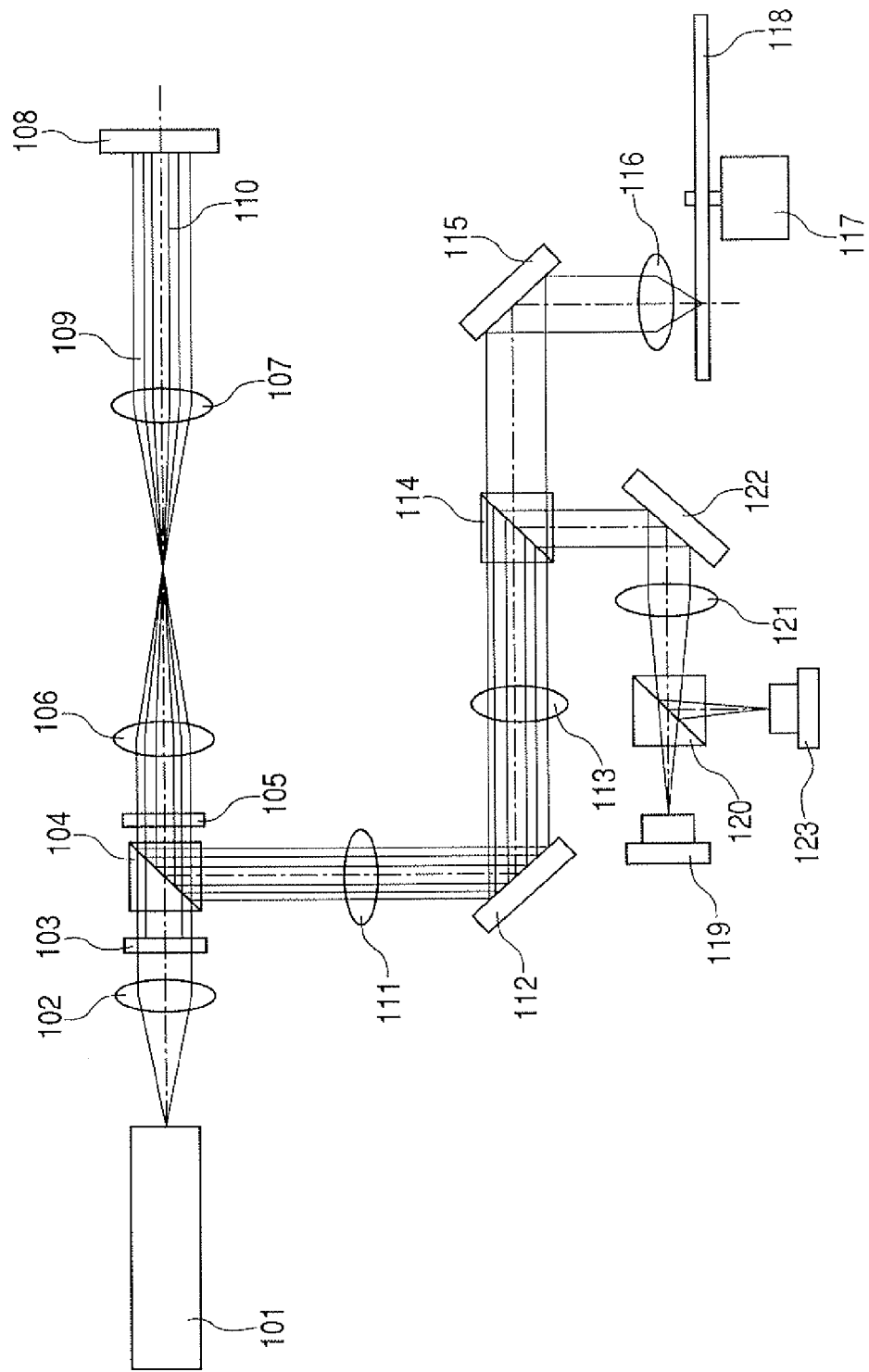
FIG. 3 is a block diagram illustrating an optical system during reproduction.
Figure 4:
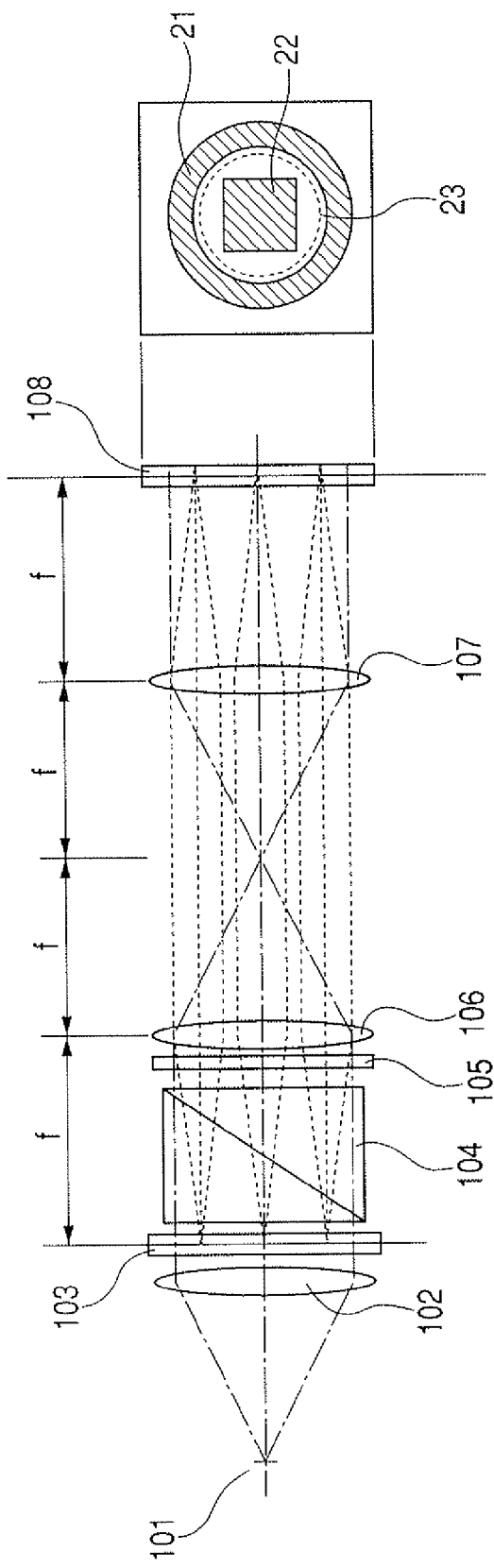
FIG. 4 is a detailed diagram of an optical arrangement shown in FIG. 1.
Figure 5:
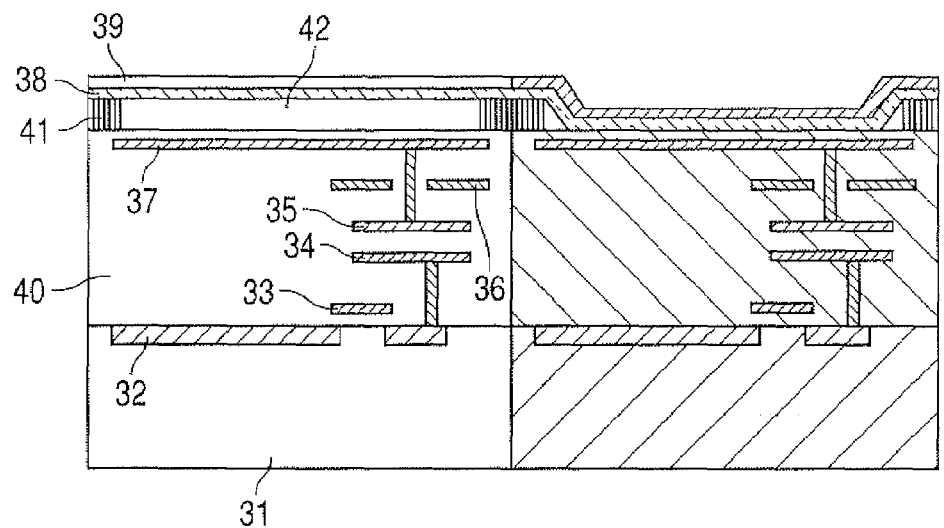
FIG. 5 is a cross-sectional view of a light interference type spatial light modulating/photodetector element used in the present invention.
Figure 6:
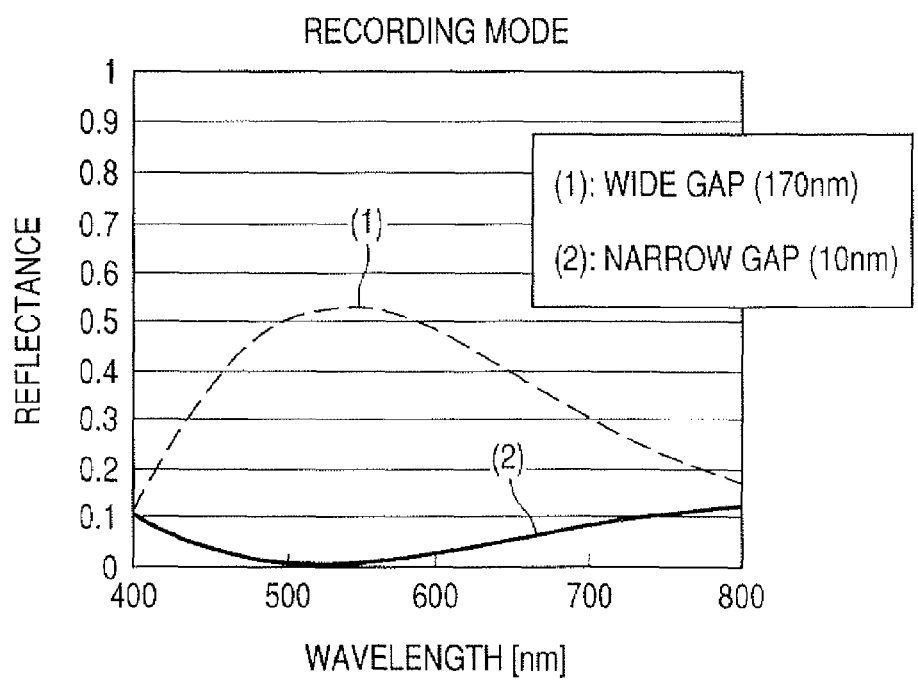
FIG. 6 illustrates an example of spectral reflectance characteristics of a light interference element.
Figure 7:
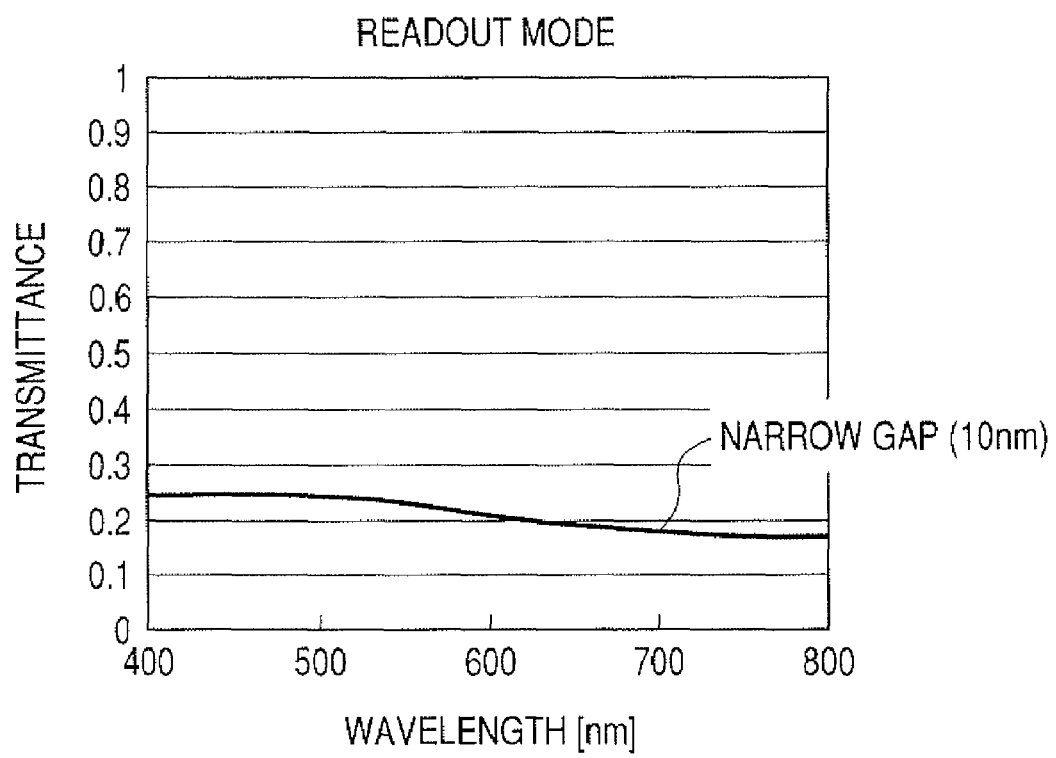
FIG. 7 illustrates an example of spectral reflectance characteristics of a light interference element.

FIG. 3 is a block diagram illustrating an optical system during reproduction. FIG. 4 is a detailed diagram of an optical arrangement of FIG. 1. FIG. 5 is a cross-sectional diagram of a light interference type spatial light modulating/photodetector element used in the present invention. FIGS. 6 and 7 each show an example of spectral reflectance characteristics of a light interference element.

First, the case where information is recorded on a hologram disk 118 that is a recording medium will be described with reference to FIGS. 1, 2, and 4.

In FIG. 1, a light beam emitted from a green laser 101 of a light source is collimated by a collimator 102 to be incident upon a mask element 103.

The mask element 103 masks a portion corresponding to information light in a center portion of a light beam.

The mask element 103 is a liquid crystal element in this embodiment, but a mask covering a center portion may be inserted in an optical path. During recording, the mask element 103 does not function to transmit all the light beams.

The light beam transmitted through a polarizing beam splitter PBS 104 as P-polarized light is transmitted through a quarter wavelength plate QWP 105 provided as required.

After that, the light beam passes through a relay lens (A) 106 and a relay lens (B) 107, and illuminates a spatial light modulating/photodetector element (hereinafter, referred to as an SLM/CMOS) 108 with a spatial light modulator SLM and a CMOS sensor mounted on one chip.

In the case of using a light interference modulating element with a configuration in which a polarized state is not changed as an SLM, the quarter wavelength plate QWP 105 may be provided previously.

Herein, a collinear holographic memory optical system of the present invention will be described with reference to FIG. 4.

In FIG. 4, an optical path from the green laser 101 to the SLM/CMOS 108 is represented by a dot and dash line.

The light beam collimated by the collimator 102 passes through the mask element 103, the PBS 104, and the quarter wavelength plate QWP 105 successively to be incident upon a relay lens system.

In this embodiment, the mask element 103 is a liquid crystal element, and has angle dependency with respect to incident light together with the PBS. Therefore, this configuration is preferable for obtaining a satisfactory S/N with the extinction ratio enhanced.

Since the relay lens (A) 106 and (B) 107 are provided with an interval of 2f with f being a focal distance, the light beam once forms an image between the relay lenses and is collimated by the relay lens (B) 107 again. The light beam incident upon the SLM/CMOS 108 is desirably collimated so as to enhance the optical efficiency.

On the other hand, an optical path from the mask element 103 to the SLM/CMOS 108 is represented by a dotted line. A mask image of the mask element 103 placed after the collimator 102 needs to be formed on the SLM/CMOS 108 so as to shield a required portion.

Because the mask element 103 is provided at the distance f from the relay lens (A) 106, the mask image is formed on the SLM/CMOS 108 by the relay lens (B) 107.

A front view of the SLM/CMOS 108 is shown in FIG. 4.

On the SLM/CMOS 108, a pattern 21 for reference light and a pattern 22 for object light are arranged on the same axis. The mask image 23 shields the pattern for object light during reproduction of information.

As described above, the collinear holographic memory optical system of the present invention collimates a light beam transmitted and reflected by the mask element, the PBS, and the SLM/CMOS 108, and forms a mask element image on a modulating/photodetector element. The SLM/CMOS 108 will be described later in detail.

In FIG. 2, the light beam reflected by the SLM/CMOS 108 and transmitted through the quarter wavelength plate QWP 105 is converted into circular polarized light (e.g., clockwise circular polarized light). After that, the light beam passes through the relay lens (A) 106 and the relay lens (B) 107 to be incident upon the SLM/CMOS 108.

Light reflected by a pixel representing information "1 (white)" on the SLM is reflected to the hologram disk 118 with a high reflectance. Light reflected by a pixel representing information "0 (black)" is reflected in an only small amount to the hologram disk 118 due to interference.

In the same way as in a conventional example, provided on the collinear SLM are a portion for modulating an information light 110 and a portion for modulating a reference light 109 surrounding the information light 110 in an annular shape.

In FIG. 2, the light beam reflected by the SLM/CMOS 108 becomes reverse circular polarized light (e.g., counterclockwise circular polarized light).

The light beam having passed through the relay lens (B) 107 and the relay lens (A) 106 is transmitted through the quarter wavelength plate QWP 105 to be converted into S-polarized light, and reflected by the PBS 104 to be outputted to the hologram disk 118.

The reference light 109 and the information light 110 reflected by the pixel representing information "1 (white)" on the SLM of the SLM/CMOS 108 is reflected by the polarizing beam splitter PBS 104.

After that, the light beam travels to the hologram disk 118 via a relay lens (1) 111, a mirror 112, a relay lens (2) 113, and a dichroic BS 114. After that, the light beam is reflected by a mirror 115 to be incident upon an objective lens 116 at the focal distance f.

A pattern displayed on the SLM of the SLM/CMOS 108 by the two relay lenses (1) and (2) forms an intermediate image at the position distance f before the objective lens 116.

Consequently, a so-called 4f optical system is configured, in which a pattern image (not shown) on the SLM, the objective lens 116, and the hologram disk 118 are placed at the distance f.

The hologram disk 118 has a disk shape, and is held on a spindle motor 117 rotatably. The reference light 109 and the information light 110 are condensed onto a recording medium (not shown) on the disk by the objective lens 116, and interfere with each other to form an interference fringe.

On a polymer material in the recording medium, the interference fringe pattern during recording is recorded as a refractive index distribution, and a digital volume hologram is formed. Further, a reflective film is provided in the recording medium.

In the same way as in the conventional example, in addition to the green laser 101 for performing recording and reproduction of a hologram, a red laser 119 having no photosensitivity with respect to a recording medium is provided.

Consequently, the displacement of the hologram disk 118 can be detected with high precision, with the above-mentioned reflective film being a reference surface.

Owing to the above, even when axial deflection and radial runout occur in the hologram disk 118, a recording spot can be allowed to follow the recording medium surface dynamically, using an optical servo technique, and an interference fringe pattern can be recorded with high precision.

A light beam emitted from the red laser 119 is transmitted through a beam splitter BS 120, and collimated by a lens 121. After that, the light beam is reflected by a mirror 122 and a dichroic BS 114, and becomes incident upon the hologram disk 118.

After that, the light beam is reflected by the mirror 115 to be incident upon the objective lens 116, and condensed as a minute light spot on a reflective surface on the hologram disk 118.

The reflected light beam becomes incident upon the objective lens 116 again to be collimated. After that, the light beam reflected by the mirror 115 and the dichroic BS 114 successively passes through the mirror 122 and the lens 121 in the same way as in the forwarding path, is partially reflected by the beam splitter BS 120, and guided to a photodetector 123.

The photodetector 123 has a plurality of light receiving surfaces (not shown) and can detect positional information on the reflective surface by a known method and perform focusing and tracking of the objective lens 116 based on the positional information.

Next, the case where recorded information is reproduced from the hologram disk 118 that is a recording medium will be described with reference to FIG. 3.

A light beam emitted from the green laser 101 of a light source illuminates a spatial light modulator SLM 108.

During reproduction, the mask element 103 has a function of masking a portion corresponding to information light in a center portion of a light beam.

A liquid crystal element of this embodiment rotates the polarized direction of only a center portion of a light beam by 90° to obtain S-polarized light, and reflects the S-polarized light by the PBS 104 so that the S-polarized light does not reach the SLM/CMOS 108. Further, a mask shielding the center portion may be inserted in an optical path.

Two relay lenses (A) 106 and (B) 107 have a function of allowing an image of the mask element 103 to be formed on the SLM of the SLM/CMOS 108, and only the portion of the element corresponding to the reference light is irradiated and that corresponding to the information light is shielded.

Only the portion for modulating the reference light 109 on the SLM/CMOS 108 displays information "1 (white)", and the portion for modulating the information light 110 displays information "0 (black)".

Thus, only the light reflected by a pixel in the portion of the reference light is reflected to the hologram disk 118. A light beam of a pixel in the portion of the information light is not reflected to the hologram 118 as well as not irradiated, so information light with a better S/N compared with a conventional example can be reproduced.

In the same way as in recording, the reference light 109 is reflected by the PBS 104, and condensed onto a recording medium (not shown) on a disk to reproduce information light from a recorded interference fringe.

Information light reflected by the reflective film in the recording medium becomes incident upon the objective lens 116 again to be collimated, and reflected by the mirror 115. At this time, an intermediate image of the reproduced display pattern of the SLM is formed at the distance f from the objective lens 116.

The light beam transmitted through the dichroic BS 114 passes through a relay lens (2) 113, a mirror 112, and a relay lens (1) 111 to be incident upon the polarizing beam splitter PBS 104. The light beam is formed again as an intermediate image (not shown) of a display pattern of the SLM at a position conjugate to the mask element 104 by the relay lenses (1) and (2).

Then, the intermediate image formed again is reflected by the PBS 104, and formed on the SLM/CMOS 108 by the two relay lenses (A) and (B)

A portion of a photodetector element (CMOS sensor in this embodiment) of the SLM/CMOS 108 is placed only between pixels in a portion in which information light is irradiated.

Owing to the function of the mask element 104, unwanted reference light is not incident between pixels in a portion of the information light where photodetector elements are formed, whereby a reproducing signal with satisfactory S/N is obtained.

The light interference type SLM/CMOS 108 will be described with reference to FIGS. 5 to 7. FIG. 5 is a cross-sectional view (schematic view) of an element in which the light interference type spatial light modulator SLM and the photodetector element CMOS sensor used in the present invention are integrated vertically.

Reference numeral 31 denotes a Si substrate, 32 denotes a photodiode, 33 denotes a transfer transistor of a CMOS sensor, 34 denotes a CMOS sensor wiring, 35 denotes a SLM element wiring, 36 denotes a light-shielding film, 37 denotes a light interference mirror (A), 38 denotes a light interference mirror (B), 39 denotes a outermost surface protective film, 40 denotes an interlayer film, and 41 denotes a support. An interlayer insulator, other Tr wirings of a CMOS sensor, and Tr wirings for writing of the SLM are omitted.

In this drawing, an interference is caused between the light interference mirror (A) 37 and the light interference mirror (B) 38, and the space therebetween (e.g., air) is changed, whereby the reflectance and transmittance are changed.

The configuration in the drawing is of a vertically integrated type. According to this configuration, a transmission mode is also used for reading with a CMOS sensor, so both the mirrors need to be semi-transparent. However, in the case of a horizontal arrangement, a light interference portion is not required to be used for a transmission mode, so the light interference mirror (A) 37 does not need to be semi-transparent.

For example, Ti is used for a semi-transparent mirror. However, the present invention is not limited thereto. In the case where the mirror is not semi-transparent, a material with a high reflectance is preferable, and a metal film made of Al, AlSi, AlCu, Ti, Ta, W, Ag, Pt, Ru, Ni, Au, TiN, or the like, or a compound film made of any of the metals is used. However, the present invention is not particularly limited.

Reference numeral 41 denotes a support insulating film on a reflective electrode, which is, for example, a silicon nitride film. Reference numeral 39 denotes a protective film of a semi-transparent film, which is, for example, a silicon oxide film.

Insulating films 39, 40, and 41 may be made of different materials or the same material. As long as they are made of an insulating material, since there is no electrical problem, the present invention is not particularly limited.

The operation of the interference portion will be described. First, the light interference mirror (B) 38 of Ti is supplied with a ground potential of 0 V. The light interference mirror (A) 37 of Ti is supplied with a voltage by the above-mentioned active matrix operation, whereby the air gap is adjusted by the Coulomb force of the light interference mirrors (A) and (B).

FIG. 6 shows reflectances in a wide gap and a narrow gap with a layer configuration of an outermost surface protective film 39 ($SiO_2$: 10 nm), a light interference mirror (B) 38 (Ti: 5 nm/$Si_3N_4$: 20 nm/$SiO_2$: 10 nm/$Si_3N_4$: 20 nm), a gap 42 (170 nm in the case of a wide gap, and 10 nm in the case of a narrow gap), and a light interference mirror (A) 37 (Ti: 15 nm ($SiO_2$: 10 nm on the surface)).

For a light with a wavelength of 550 nm, the reflectances at air gaps of 170 nm and 10 nm are 52.5% and 1.2%, respectively.

It is understood that, when the air gap is changed from 10 nm to 170 nm by the voltage supplied to the light interference mirror (A) 37, the reflectance is changed largely accordingly.

The interference function can be designed depending upon the wavelength, semi-transparent film material, and air gap thickness, and it is important to design a required configuration considering the characteristics such as physical strength and a contrast ratio. Reference numerals 34, 35, and 36 denote underlying wiring layers, and 36 denotes a light-shielding layer, which prevents incident light from reaching a lower transistor region.

In the case of reading, regarding a pixel upon which at least information light becomes incident, it is necessary to keep a transmittance constant with the state of light interference being the same.

FIG. 7 shows a transmittance in the case where the air gap is set to be 10 nm. In this case, although the transmittance is relatively low (i.e., 23.0%), the absolute value of a transmittance is not so important because it is important that the transmittance is constant. Owing to the constant transmittance, the black and white intensities of the information light can be determined with the CMOS sensor.

Embodiment 2

Figure 8:
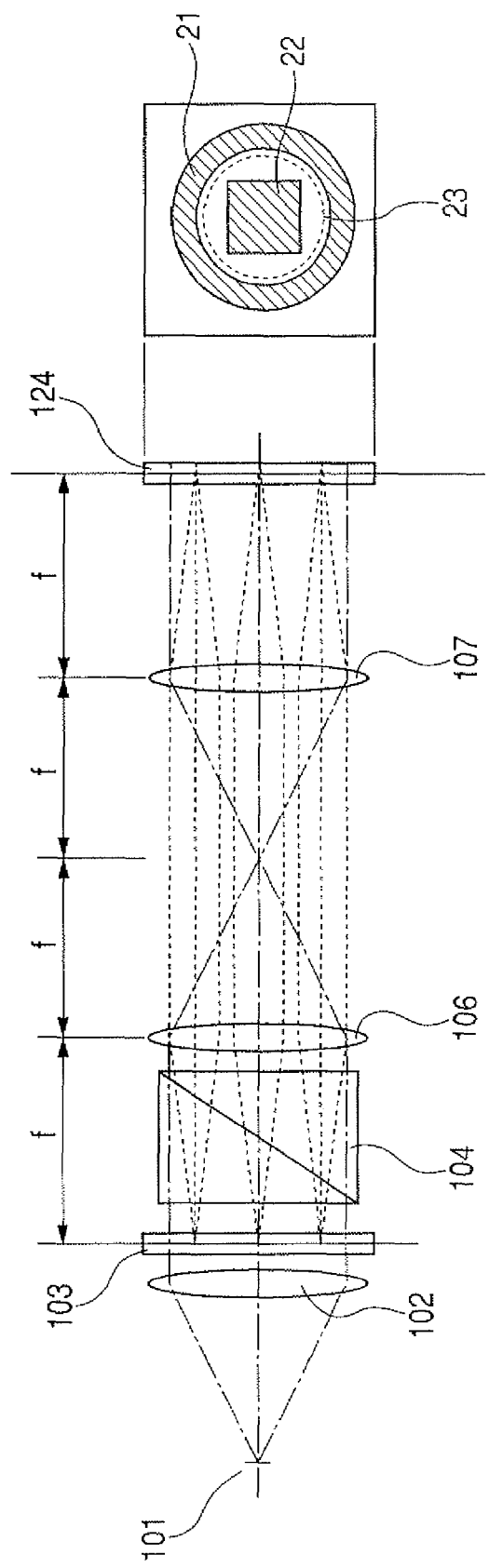
FIG. 8 is a detailed diagram of a liquid-crystal-on-silicon element in Embodiment 2.
Figure 9:
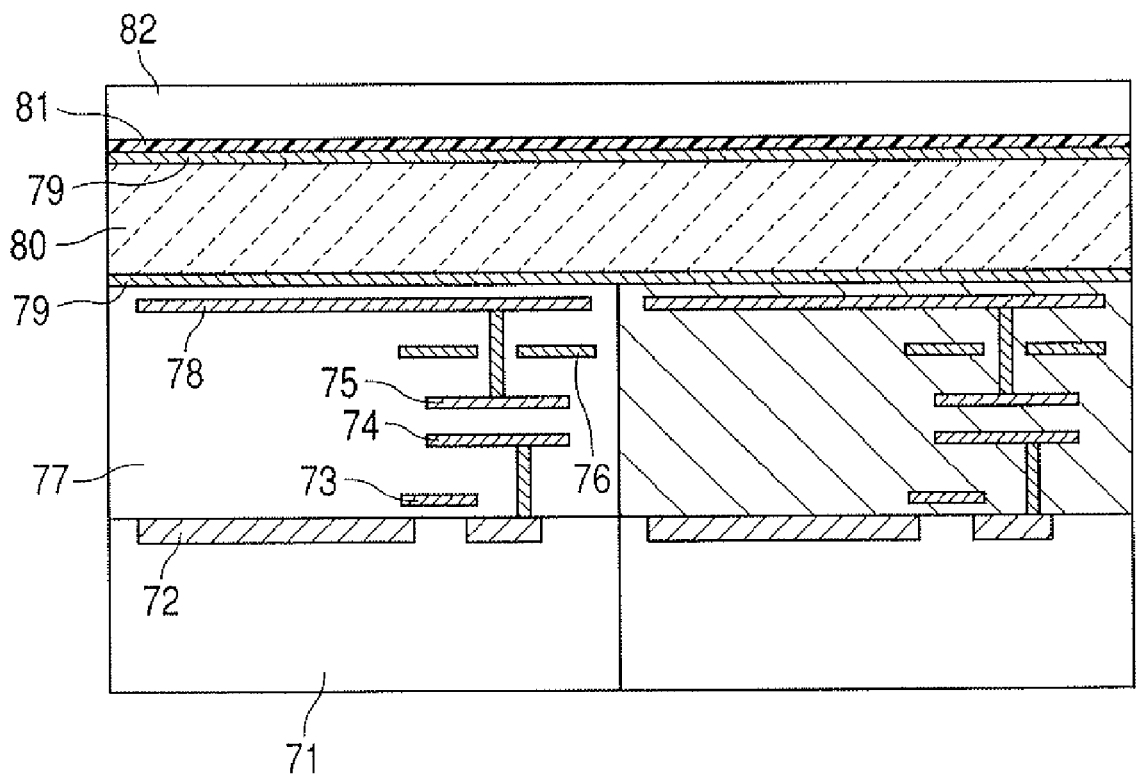
FIG. 9 is a cross-sectional view of a reflection type liquid crystal element used in the present invention.

FIGS. 8 and 9 each illustrate Embodiment 2 of a collinear holographic memory optical system of the present invention. The components having the same functions as those in Embodiment 1 are denoted with the same reference numerals as those therein. FIG. 8 is a detailed diagram of an optical arrangement of Embodiment 2. FIG. 9 is a cross-sectional view of a reflection type liquid crystal element used in the present invention.

As shown in FIG. 8, in the case of a reflection type liquid crystal (LCOS) element that changes a polarized state by 90° as the SLM (124), the quarter wavelength plate QWP 105 is not required. The detail of the remaining optical system is the same as that described in FIG. 4, so the description thereof will be omitted here.

Embodiment 2 will be described with reference to FIGS. 1 to 3.

Embodiment 2 is different from Embodiment 1 in the following point. A light beam passes through the relay lens (A) 106 and the relay lens (B) 107, and illuminates the SLM/CMOS 108.

Light reflected by a pixel representing information "1 (white)" on the SLM is converted into S-polarized light, and light reflected by a pixel representing information "0 (black)" holds a state of P-polarized light.

In the same way as in the conventional example, provided on the collinear SLM are a portion for modulating the information light 110 and a portion for modulating the reference light 109 surrounding the information light 110 in an annular shape.

In FIG. 2, among the light beams reflected by the SLM/CMOS 108, the S-polarized light is reflected by the PBS 104 to be outputted to the hologram disk 118, and the P-polarized light is transmitted through the PBS 104 and does not travel to the hologram disk 118. The subsequent optical system is the same as that in Embodiment 1, so the description thereof will be omitted here.

FIG. 9 is a cross-sectional view (schematic view) of an element according to the present invention in which a reflection type liquid crystal (LCOS) spatial light modulator SLM and a photodetector element CMOS sensor are placed vertically.

Reference numeral 78 denotes a pixel electrode, 79 denotes an alignment film, 80 denotes a liquid crystals, 81 denotes an ITO, and 82 denotes a glass.

For example, assuming that the alignment film is a diagonally deposited $SiO_2$ film, the liquid crystal is a vertical liquid crystal, the pixel electrode is a semi-transparent film (e.g., with a reflectance of 50%), and 81 denotes a common electrode, in the "1" display, the pixel electrode is supplied with a voltage, and the liquid crystal is supplied with an electric field, whereby the liquid crystal molecules tilt.

In the "0" display, the liquid crystal is not supplied with an electric field, so the liquid crystal molecules rise substantially vertically. When light is transmitted through the polarizing beam splitter PBS as P-polarized light before being incident, and becomes incident as linear polarized light, in the "0" display the linear polarized light is reflected at an intensity of 50% by the pixel electrode without changing the polarized direction. The light becomes incident upon the PBS again. However, the polarization thereof is not changed, and the light is transmitted through again and does not reach the hologram.

On the other hand, at a time of the "1" display, the reflectance at the pixel electrode is 50%. However, light becomes linear polarized light rotated by 90°, so the light is reflected by the PBS as S-polarized light and written in the hologram. At this time, the thickness of the liquid crystal is designed so that a phase of $\lambda/2$ is generated by going forward and backward in the liquid crystal.

Even in the case of the "1" display, the intensity of light becomes 50%, which is a sufficient intensity for discriminating "1" from "0".

In the case of reading, the polarized state is not related, so the liquid crystal may be in any state.

Embodiment 3

Figure 10:
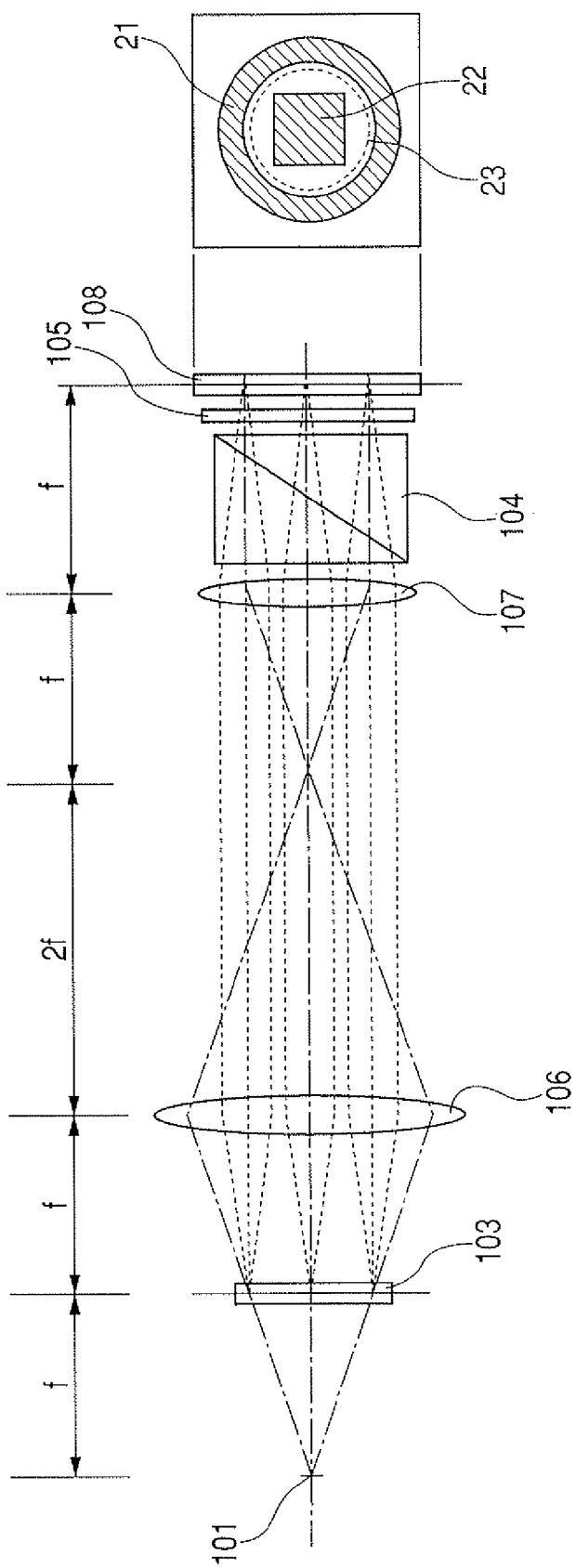
FIG. 10 is a block diagram showing Embodiment 3 of a collinear holographic memory optical system of the present invention.

FIG. 10 is a block diagram showing Embodiment 3 of a collinear holographic memory optical system of the present invention. The components having the same functions as those in Embodiment 1 are denoted with the same reference numerals as those therein.

In FIG. 10, the optical path from the above-mentioned green laser 101 to the SLM/CMOS 108 is represented by a dot and dash line.

The relay lens system of this embodiment is composed of only two relay lenses. The relay lenses (A) 106 and (B) 107 are placed at a distance of 2f from the green laser 101 with f being a focal length.

The mask element 103 is placed at a distance f from the LD and between the green laser 101 and the relay lens (A) 106.

The distance between the relay lenses (A) and (B) is 3f, and a light source image of the LD is formed at the same magnification by the relay lens (A), collimated by the relay lens (B), passes through the PBS 104 and the quarter wavelength plate QWP 105 successively, and becomes incident upon the SLM/CMOS 108 in the same way as in Embodiment 1.

In this embodiment, the PBS has angle dependency with respect to incident light. Therefore, this configuration enhances the extinction ratio, and is preferable for obtaining a satisfactory S/N.

Further, it is desirable that a light beam incident upon the SLM/CMOS 108 is collimated for the purpose of enhancing optical efficiency.

On the other hand, an optical path from the mask element 103 to the SLM/CMOS 108 is represented by a dotted line.

A mask image of the mask element 103 placed between the green laser 101 and the relay lens (A) 106 needs to be formed on the SLM/CMOS 108 to shield a required portion exactly.

Since the mask element 103 is provided at a distance f from the relay lens (A) 106, the mask image is formed on the SLM/CMOS 108 by the relay lens (B) 107.

FIG. 10 similarly shows a front view of the SLM/CMOS 108.

On the SLM/CMOS 108, a pattern 21 for reference light and a pattern 22 for object light are placed coaxially.

The mask image 23 shields the pattern for object light during reproduction of information.

As described above, the collinear holographic memory optical system of the present invention collimates a light beam transmitted through and reflected by the PBS and the modulating/photodetector element, and forms a mask element image on the modulating/photodetector element.

Embodiment 4

Figure 11:
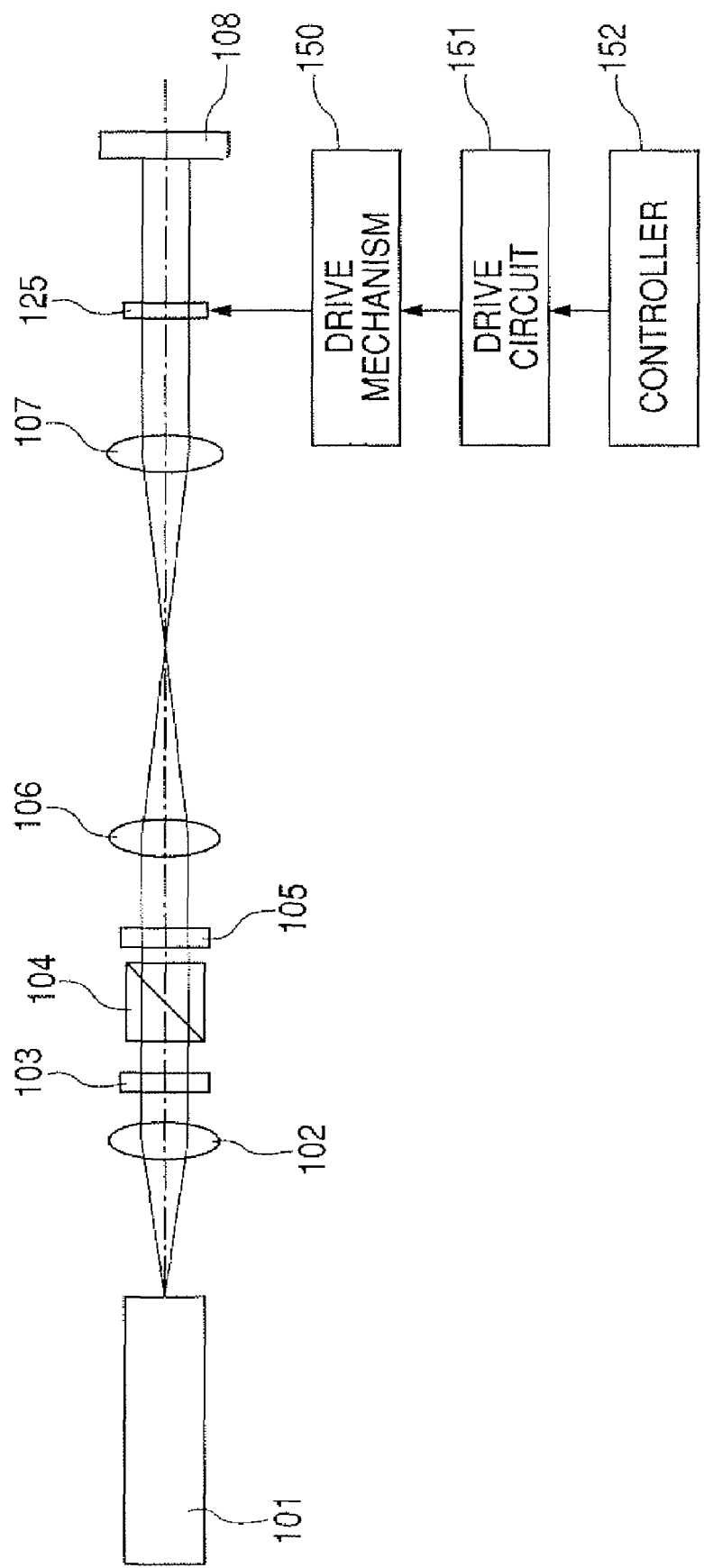
FIG. 11 is a schematic diagram showing an optical system during recording (from a light source to an SLM) according to Embodiment 4 of the present invention.
Figure 12:
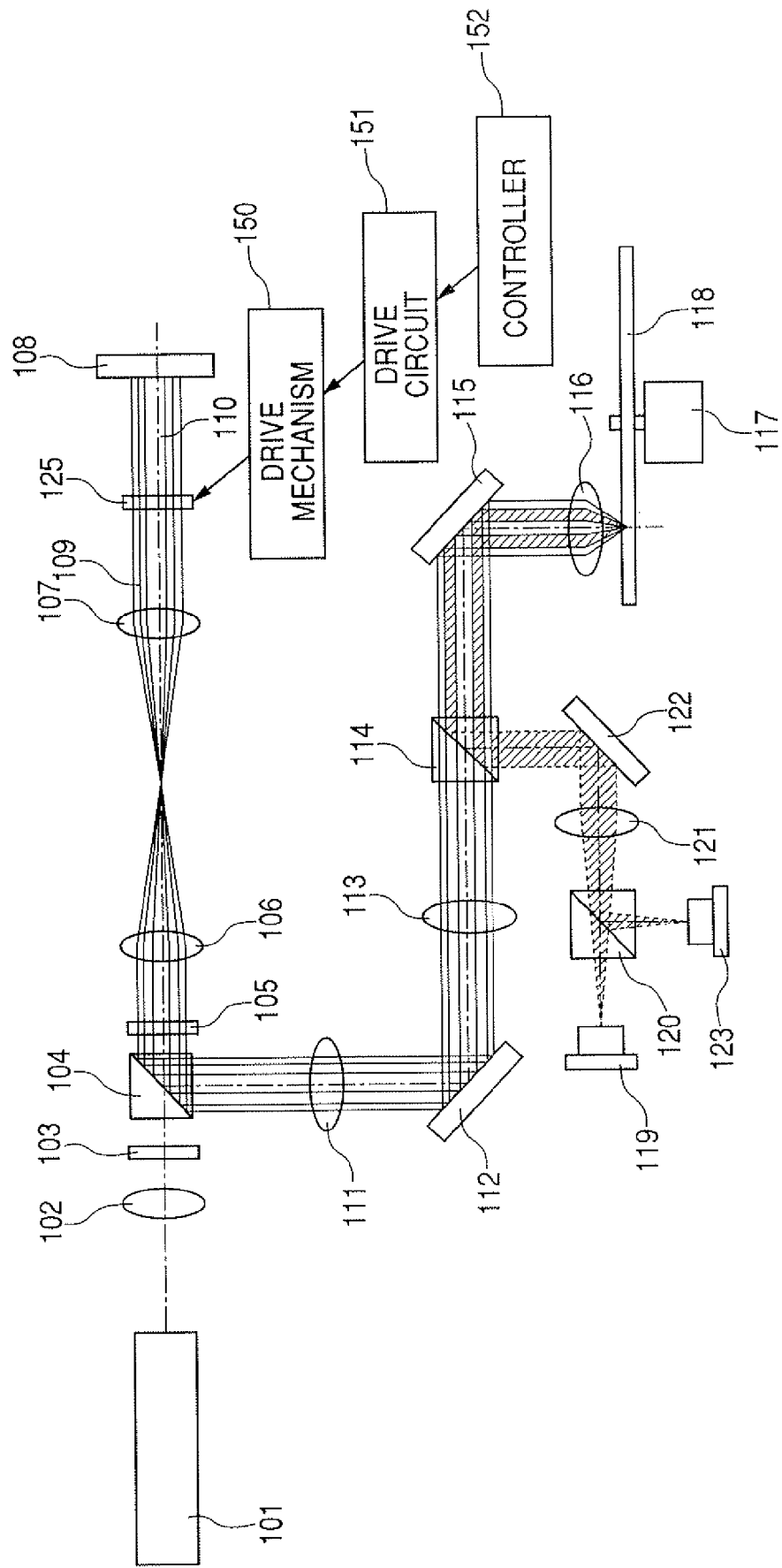
FIG. 12 is a schematic diagram showing an optical system (from an SLM to a hologram memory medium) during recording according to Embodiment 4 of the present invention.
Figure 13:
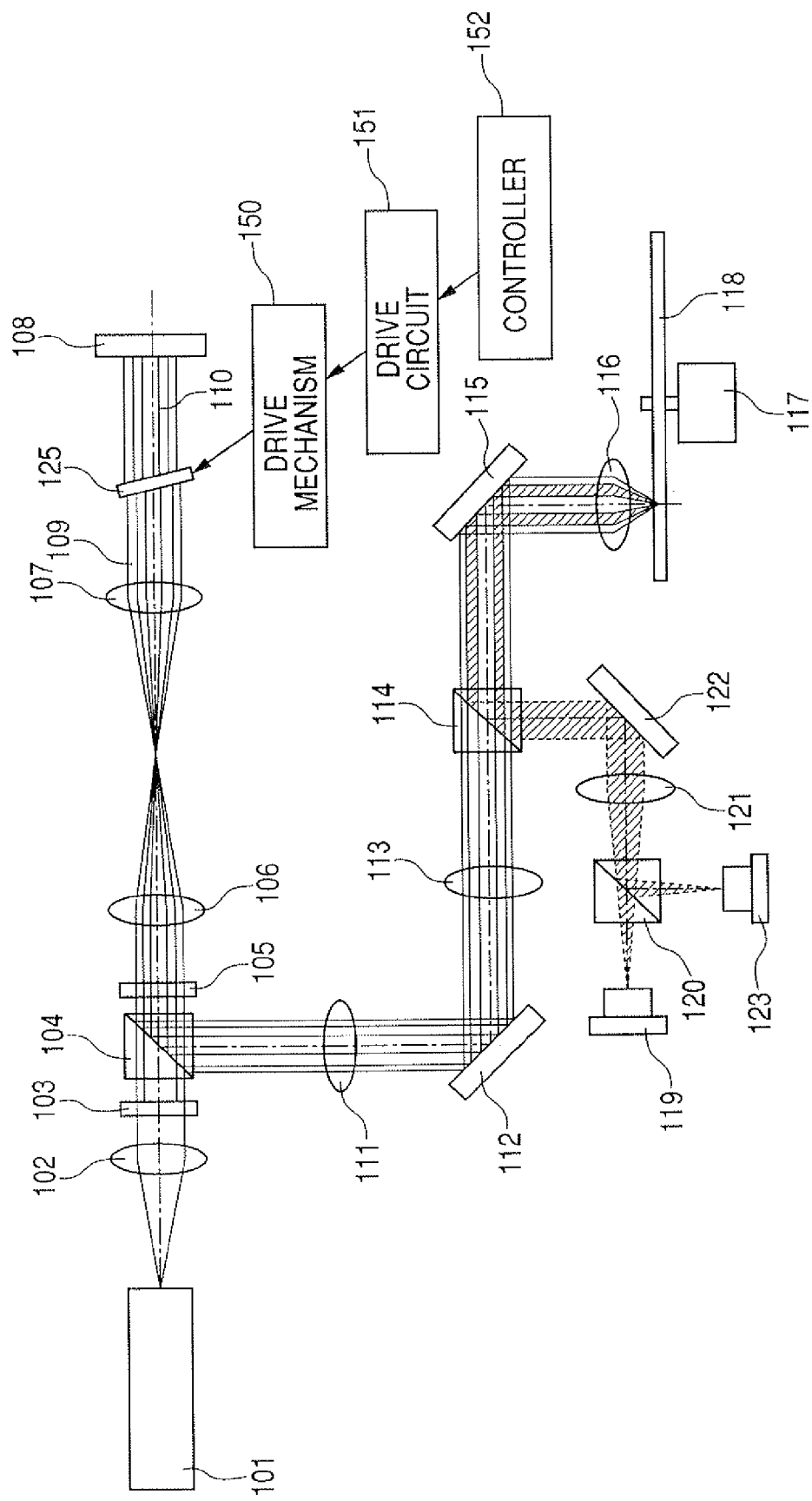
FIG. 13 is a schematic diagram showing an optical system during reproduction according to Embodiment 4 of the present invention.

FIGS. 11 to 13 are diagrams illustrating optical systems of a collinear holographic memory of Embodiment 4 according to the present invention. FIG. 11 shows an optical system from a light source to a spatial light modulator during recording, and FIG. 12 similarly shows an optical system from the spatial light modulator to a hologram disk during recording. FIG. 13 shows an optical system during reproduction.

First, the case of recording information on a hologram disk 118 that is a recording medium will be described with reference to FIGS. 11 and 12. In FIG. 11, a light source outputted from a green laser 101 of a light source is collimated by a collimator 102, and becomes incident upon a mask element 103. The mask element 103 has a function of masking a portion corresponding to the information light in a center portion of a light beam.

In this embodiment, although a liquid crystal element is used as the mask element 103, a mask shielding the center portion may be put in an optical path. During recording, the mask element 103 does not function, and transmits all the light beams.

In this embodiment, a liquid crystal element is used as the mask element 103, for example, and a driving voltage from a drive circuit (not shown) to the liquid crystal element is switched on/off between recording and reproduction based on the control of a controller 152. Accordingly, all the light beams are transmitted during recording, and a portion corresponding to the information light in a center portion of a light beam is masked during reproduction.

A light beam transmitted through a polarizing beam splitter PBS 104 as P-polarized light is transmitted through a quarter wavelength plate QWP 105 provided if required, and is transmitted through a relay lens (A) 106 and a relay lens (B) 107.

Further, the light beam passes through a parallel plate 125 disposed so as to be tiltable with respect to the light beam, and illuminates an SLM/CMOS 108 with a spatial light modulator SLM and a CMOS sensor mounted on one chip.

The parallel plate 125 is configured so as to be tiltable with respect to an optical axis by the driving of a drive mechanism 150. However, detailed description thereof will be made later. During recording, as shown in FIG. 11, the parallel plate 125 is vertical to the optical axis without tilting. On the other hand, during reproduction, as described later, the parallel plate 125 is tilted with respect to the light beam by the control of the controller 152.

As the drive mechanism 150 of the parallel plate 125, for example, a drive mechanism with a plunger is used so as to switch the parallel plate 125 between a vertical state and a tilted state with respect to the optical axis. Then, the drive circuit 151 is controlled by the controller 152, and the driving voltage from the drive circuit 151 to the drive mechanism 150 is switched on/off between recording and reproduction. Accordingly, the parallel plate 125 is made vertical to the light beam during recording, and tilted with respect to the light beam during reproduction.

Further, a stepping motor may be used for driving the parallel plate 125. In this case, the parallel plate 125 is configured so as to be rotatable by the rotation of the stepping motor around the center thereof as shown in FIG. 13, whereby the parallel plate 125 is switched between the vertical state and the tilted state with respect to the optical axis. Then, by switching on/off of a driving voltage from the drive circuit 151 to the stepping motor between recording and reproduction by the control of the controller 152, the parallel plate 125 is made vertical to the light beam during recording, and is tilted with respect to the light beam during reproduction.

Herein, in the case of a light interference modulating element with a configuration of not changing a polarized state as an SLM, the quarter wavelength plate QWP 105 may be provided previously. Further, in the case of a reflection type liquid crystal (LCOS) element with a configuration of changing a linear polarized state by 90° as an SLM, the quarter wavelength plate QWP 105 is unnecessary.

In the case where the SLM/CMOS 108 is a light interference modulating element/CMOS element, a light beam transmitted through the quarter wavelength plate QWP 105 is converted into circular polarized light (e.g., clockwise circular polarized light), and passes through the relay lens (A) 106 and the relay lens (B) 107 to illuminate the SLM/CMOS 108.

In FIG. 12, the light beam reflected by the SLM/CMOS 108 becomes reverse circular polarized light (e.g., counterclockwise circular polarized light). Further, the light beam having passed through the parallel plate 125 and the relay lens (B) 107 and the relay lens (A) 106 is transmitted through the quarter wavelength plate QWP 105 to be converted into S-polarized light, and is reflected by the PBS 104 to be directed to the hologram disk 118.

Further, in the case where the SLM/CMOS 108 is an LCOS element/CMOS element, the light beam passes through the relay lens (A) 106 and the relay lens (B) 107, and illuminates the SLM/CMOS 108. The light reflected by a pixel representing information "1 (white)" on the SLM is converted into S-polarized light, and light reflected by a pixel representing information "0 (black)" holds the state of P-polarized light. In the same way as in conventional examples, provided on the collinear SLM are a portion for modulating information light 110 and a portion for modulating reference light 109 surrounding the information light 110 in an annular shape.

In FIG. 12, among the light beams reflected by the SLM/CMOS 108, the S-polarized light is reflected by the PBS 104 to be directed to the hologram disk 118, and P-polarized light is transmitted through the PBS 104 without being directed to the hologram disk 118.

In any case, the reference light 109 and the information light 110 reflected by the pixel representing information "1 (white)" by the SLM of the SLM/CMOS 108 are reflected by the polarizing beam splitter PBS 104. Further, the reference light 109 and the information light 110 pass through a relay lens (1) 111, a mirror 112, a relay lens (2) 113, and a dichroic BS 114 to be directed to the hologram disk 118, and are reflected by the mirror 115 to be incident upon an objective lens 116 at a focal distance f.

The hologram disk 118 is held so as to be rotatable on a spindle motor 117. The reference light 109 and the information light 110 are condensed onto the hologram disk 118 by the objective lens 116, and interfere with each other to form an interference fringe. On a polymer material in the hologram disk 118, an interference fringe pattern during recording is recorded as a refractive index distribution, and a digital volume hologram is formed. Further, in the hologram disk 118, a reflective film is provided.

In the same way as in Embodiment 1, in this embodiment, a red laser 119 having no photosensitivity with respect to the hologram disk 118 is provided in addition to the green laser 101 for recording and reproducing a hologram. Consequently, even when axial deflection and radial runout occur in the hologram disk 118, a recording spot can be allowed to follow the recording medium surface dynamically, using an optical servo technique, and an interference fringe pattern can be recorded with high precision.

Next, the case of reproducing recorded information from the hologram disk 118 that is a recording medium will be described using FIG. 13. A light beam outputted from the green laser 101 of a light source illuminates the SLM of the SLM/CMOS 108 in the same way as that of recording. During reproduction, as described above, the mask element 103 has a function of masking a portion corresponding to information light in a center portion of the light beam.

In this embodiment, a liquid crystal element is used to rotate the polarization direction only of the center portion of the light beam by 90° to form S-polarized light, and the S-polarized light is reflected by the subsequent PBS 104, whereby the S-polarized light is prevented from reaching the SLM of the SLM/CMOS 108. Alternatively, a mask shielding the center portion may also be inserted in an optical path.

Each of two relay lens (A) 106 and relay lens (B) 107 also has the function of forming an image of the mask element 103 on the SLM of the SLM/CMOS 108. Only the portion of the element corresponding to the reference light is illuminated, and that corresponding to the information light is exactly shielded by the image (not shown) of the mask element 103.

Only a portion for modulating the reference light 109 on the SLM/CMOS 108 displays information "1 (white)", and a portion for modulating the information light 110 displays information "0 (black)". Thus, only the light reflected by the pixel of the portion of the reference light is reflected to the hologram disk 118. The light beam reflected by the pixel of the portion of the information light is not only reflected to the hologram disk 118 but also is not illuminated. Therefore, information light can be reproduced with better S/N compared with conventional examples.

During reproduction, the parallel plate 125 is tilted by θ with respect to the light beam by the driving of the drive mechanism 150 based on the control of the controller 152. Thus, the light beam outputted from the green laser 101 and having passed through the relay lens (A) 106 and the relay lens (B) 107 is shifted only by s with respect to the light beam during recording, and illuminates the SLM of the SLM/CMOS 108. The light reflected by the pixel in the portion of the reference light passes through the parallel plate 125 again, and travels to the relay lens (B) 107 on the same optical axis as that of the forwarding path.

Figure 14:
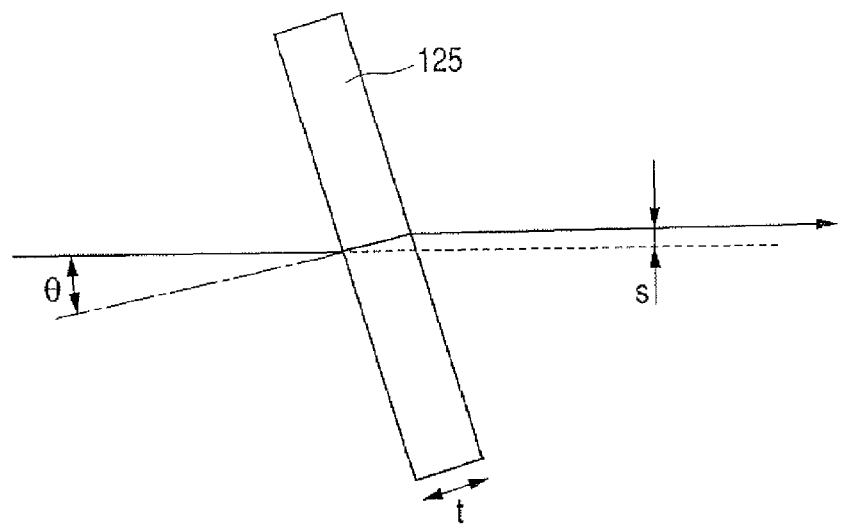
FIG. 14 is a detailed diagram showing a parallel plate during reproduction according to Embodiment 4 of the present invention.
Figure 15:
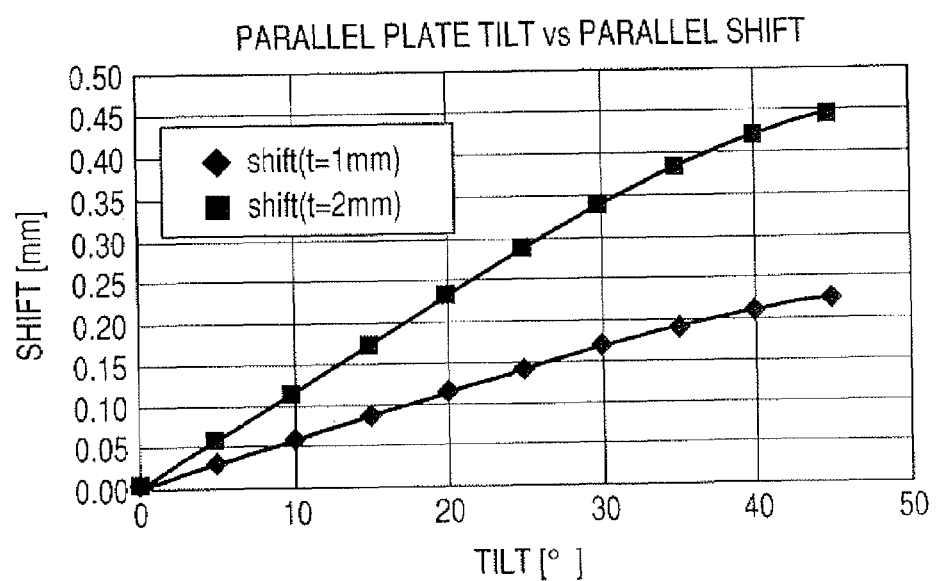
FIG. 15 is a graph showing a relationship between a tilt (θ) of a parallel plate and a shift amount (s) of a light beam according to Embodiment 4 of the present invention.

FIG. 14 is a detailed diagram of the parallel plate 125. Assuming that the shift amount is s, the plate thickness of the parallel plate is t, and the tilt (tilt angle) is θ, a relationship between s and θ is as shown in FIG. 15. In this case, the refractive index of the parallel plate 125 is 1.51, and t is 1 mm and 2 mm. In order to obtain a desired shift amount s described later, t and θ can be set arbitrarily.

In the same way as that of recording, the reference light 109 is reflected by the PBS 104 and condensed by the hologram disk 118, and the information light is reproduced from a recorded interference fringe. The information light reflected by the reflective film in the hologram disk 118 becomes incident upon the objective lens 116 again to be collimated, and reflected by the mirror 115. At this time, an intermediate image of a display pattern of the SLM reproduced at the distance f from the objective lens 116 is formed.

The light beam transmitted through the dichroic BS 114 passes through the relay lens (2) 113, the mirror 112, and the relay lens (1) 111, and is directed to the polarizing beam splitter PBS 104. Then, the light beam forms an intermediate image (not shown) of a display pattern of the SLM again at a position conjugate to the relay lens (2) 113, the relay lens (1) 111, and the mask element 103. Then, the intermediate image formed again is reflected by the PBS 104, passes through the two relay lens (A) 106 and the relay lens (B) 107, and is further shifted by s by the parallel plate 125 to be formed on the SLM/CMOS 108.

A photodetector element (CMOS sensor in this embodiment) portion of the SLM/CMOS 108 is placed only between pixels in a portion to be illuminated with the information light. Owing to the function of the mask element 103, the unwanted reference light is not incident between pixels in a portion of the information light where the photodetector element is formed, so a reproduced signal with a satisfactory S/N is obtained.

In this embodiment, since the spatial light modulator SLM and the photodetector element CMOS sensor are placed on the same chip, a complicated alignment mechanism therefor and an expensive relay lens system can be eliminated, whereby cost down and compacting of the optical system can be achieved.

Figure 16:
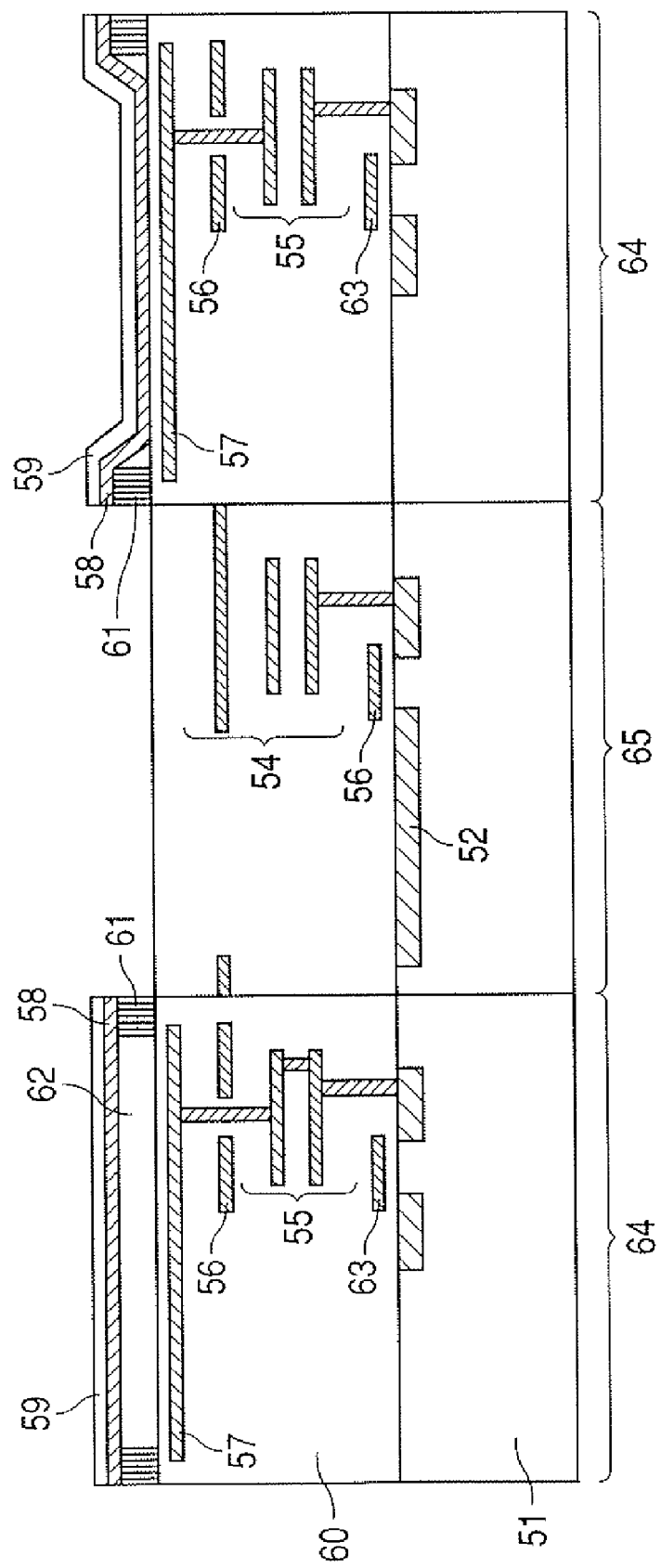
FIG. 16 is a cross-sectional view showing an integrated light interference type spatial light modulator and photodetector element (lateral arrangement) according to the present invention.

FIG. 16 is a cross-sectional view (schematic view) of an element in the case where the light interference type spatial light modulator SLM (64 denotes an SLM element region) and the photodetector element CMOS sensor (65 denotes a CMOS sensor region) according to the present invention are placed laterally.

In FIG. 16, reference numeral 51 denotes a Si substrate, 52 denotes a photodiode, 53 denotes a transfer transistor of a CMOS sensor, 54 denotes a CMOS sensor wiring, 55 denotes a SLM element wiring, 56 denotes a light-shielding film, 57 denotes a light interference mirror A, and 58 denotes a light interference mirror B. Further, reference numeral 59 denotes an outermost surface protective film, 60 denotes an interlayer film, 61 denotes a support, 62 denotes a gap, and 63 denotes a SLM data transmitting switch. An interlayer insulator, other Tr wirings of a CMOS sensor, and Tr wirings for writing of the SLM are omitted.

In FIG. 16, an interference is caused between the light interference mirror A 57 and the light interference mirror B 58, and the space therebetween (e.g., air) is changed, whereby the reflectance and transmittance are changed.

Reference numeral 61 denotes a support insulating film on a reflective electrode, which is made of, for example, a silicon nitride film. Reference numeral 59 denotes a protective film of a semi-transparent film, which is made of, for example, a silicon oxide film.

Next, the operation of the interference portion will be described. First, the light interference mirror B 58 of Ti is supplied with a ground potential of 0 V, for example. Due to the above-mentioned active matrix operation, the light interference mirror A 57 of Ti is supplied with a voltage, and the air gap is adjusted by the Coulomb force of the light interference mirrors A and B.

Figure 17:
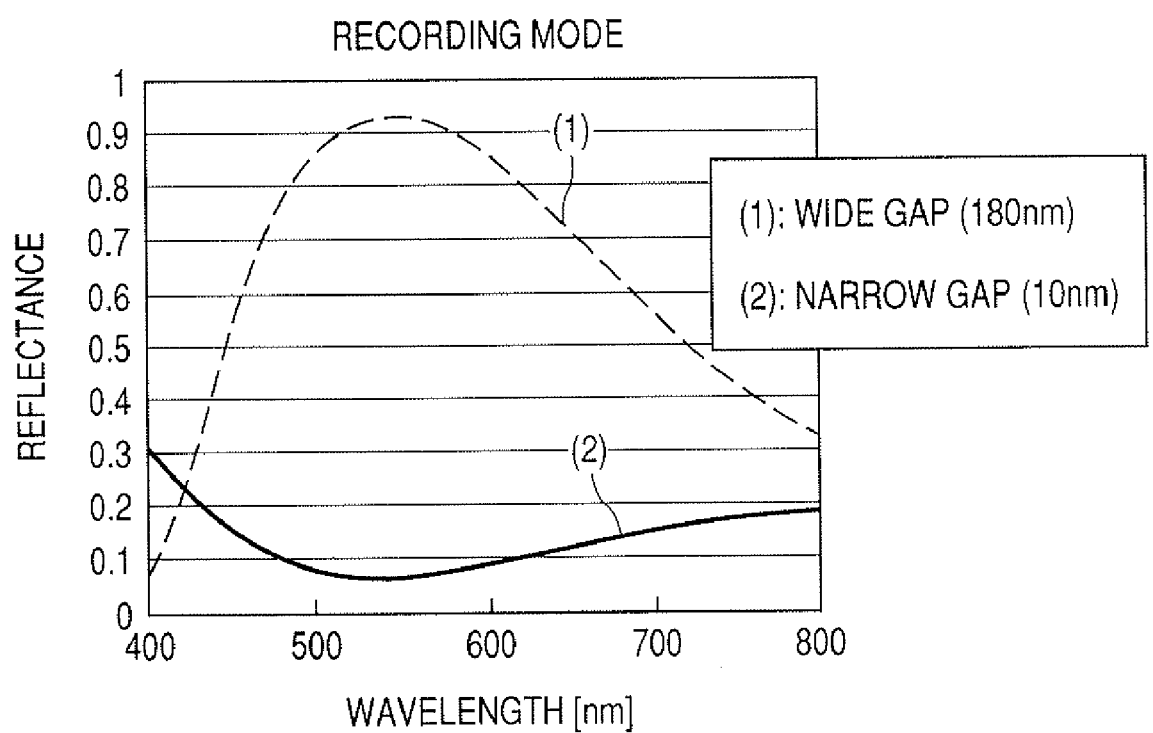
FIG. 17 is a diagram showing characteristics of a reflectance at a time of "1" and "0" of a light interference type SLM during recording according to Embodiment 4.

FIG. 17 shows characteristics of reflectance at a time of "1" and "0" of the SLM of the light interference type spatial light modulator during recording. FIG. 17 shows reflectances in a wide gap and a narrow gap with a layer configuration of an outermost surface protective film 59 ($SiO_2$: 10 nm), a light interference mirror B 58 (Ti: 5 nm/$Si_3N_4$: 20 nm/$SiO_2$: 10 nm/$Si_3N_4$: 20 nm), a gap 62 (180 nm in the case of a wide gap, and 10 nm in the case of a narrow gap), and a light interference mirror A 57 (AlSi: 100 nm ($SiO_2$: 10 nm on the surface)).

For a light with a wavelength of 550 nm, the reflectances at air gaps of 180 nm and 10 nm are 93.0% and 0.6% respectively. It is understood that, when the air gap is changed from 10 nm to 180 nm by the voltage supplied to the light interference mirror A 57, the reflectance is changed largely accordingly. The interference function can be designed depending upon the wavelength, semi-transparent film material, and air gap thickness, and it is important to design a required configuration considering the characteristics such as physical strength and a contrast ratio.

Figure 18:
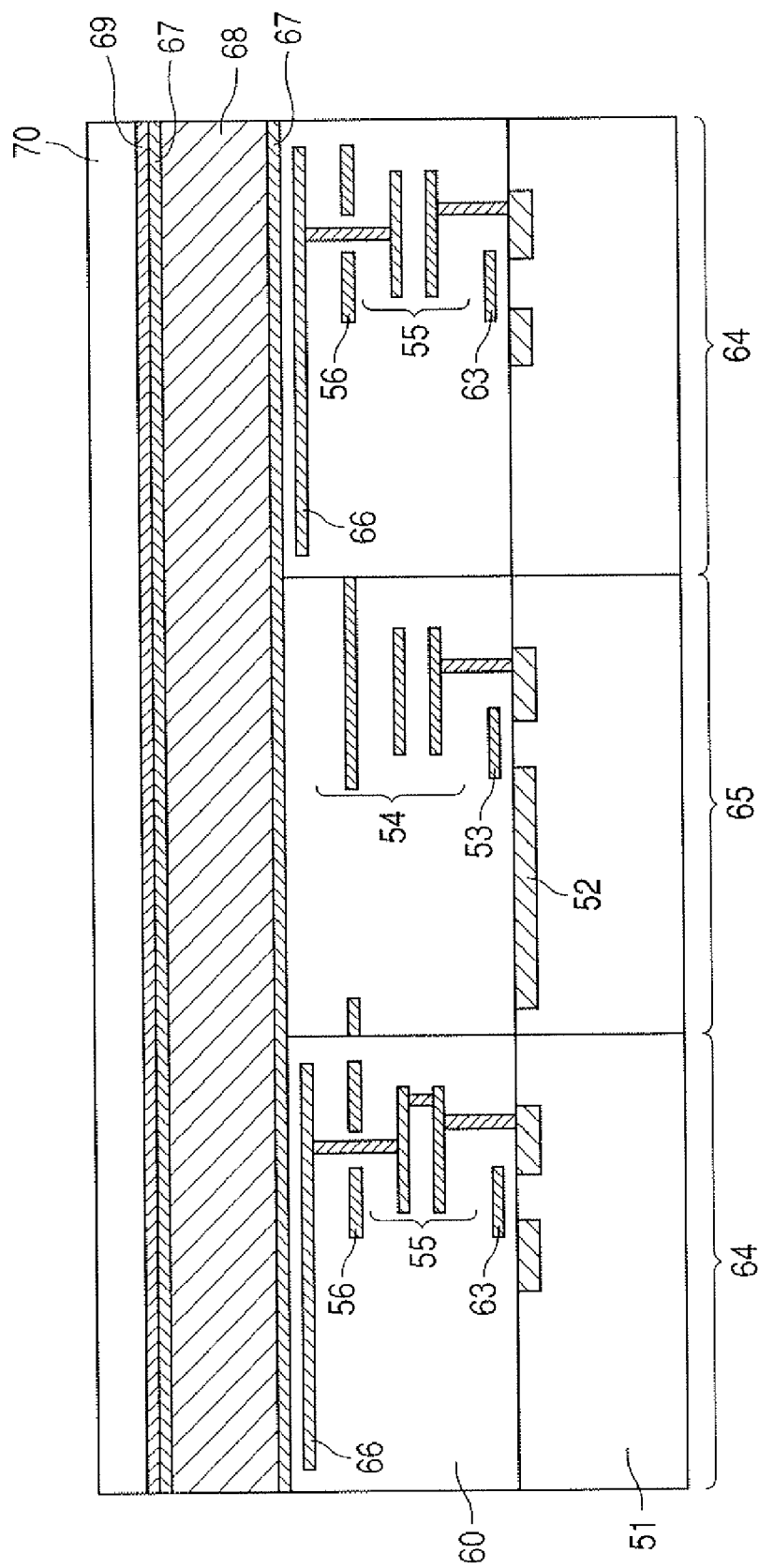
FIG. 18 is a cross-sectional view showing an integrated reflection type liquid crystal spatial modulating element and photodetector element (lateral arrangement) according to the present invention.

FIG. 18 is a cross-sectional view (schematic view) of an element according to the present invention in which a reflection type liquid crystal (LCOS) spatial light modulator SLM and a photodetector element CMOS sensor are placed laterally.

In FIG. 18, reference numeral 66 denotes a pixel electrode, 67 denotes an alignment film, 68 denotes a liquid crystals, 69 denotes an ITO, and 70 denotes a glass. For example, assuming that the alignment film is a diagonally deposited $SiO_2$ film, the liquid crystal is a reflection film, and a common electrode is used for the ITO 69, in the "1" display the pixel electrode is supplied with a voltage, and the liquid crystal is supplied with an electric field, whereby the liquid crystal molecules tilt. In the "0" display the liquid crystal is not supplied with an electric field, so the liquid crystal molecules rise substantially vertically.

When light is transmitted through the polarizing beam splitter PBS as P-polarized light before being incident, and becomes incident as linear polarized light, in the "0" display the linear polarized light is reflected by the pixel electrode without changing the polarized direction. The light becomes incident upon the PBS again. However, because the polarization thereof is not changed, the light is transmitted through again and does not reach the hologram. On the other hand, at a time of the "1" display, light becomes linear polarized light rotated by 90° (the thickness of the liquid crystal is designed so that a phase of λ/2 is generated by going forward and backward in the liquid crystal), so the light is reflected by the PBS as S-polarized light and written in the hologram.

Herein, the light beam incident upon the hologram disk 118 is adjusted and controlled so as to be incident exactly perpendicularly to the disk. In this case, an information light pattern generated on the SLM of the SLM/CMOS 108 becomes incident upon the SLM/CMOS 108 via the same path that the reflected light from the hologram disk 118 becomes incident.

Figure 19:
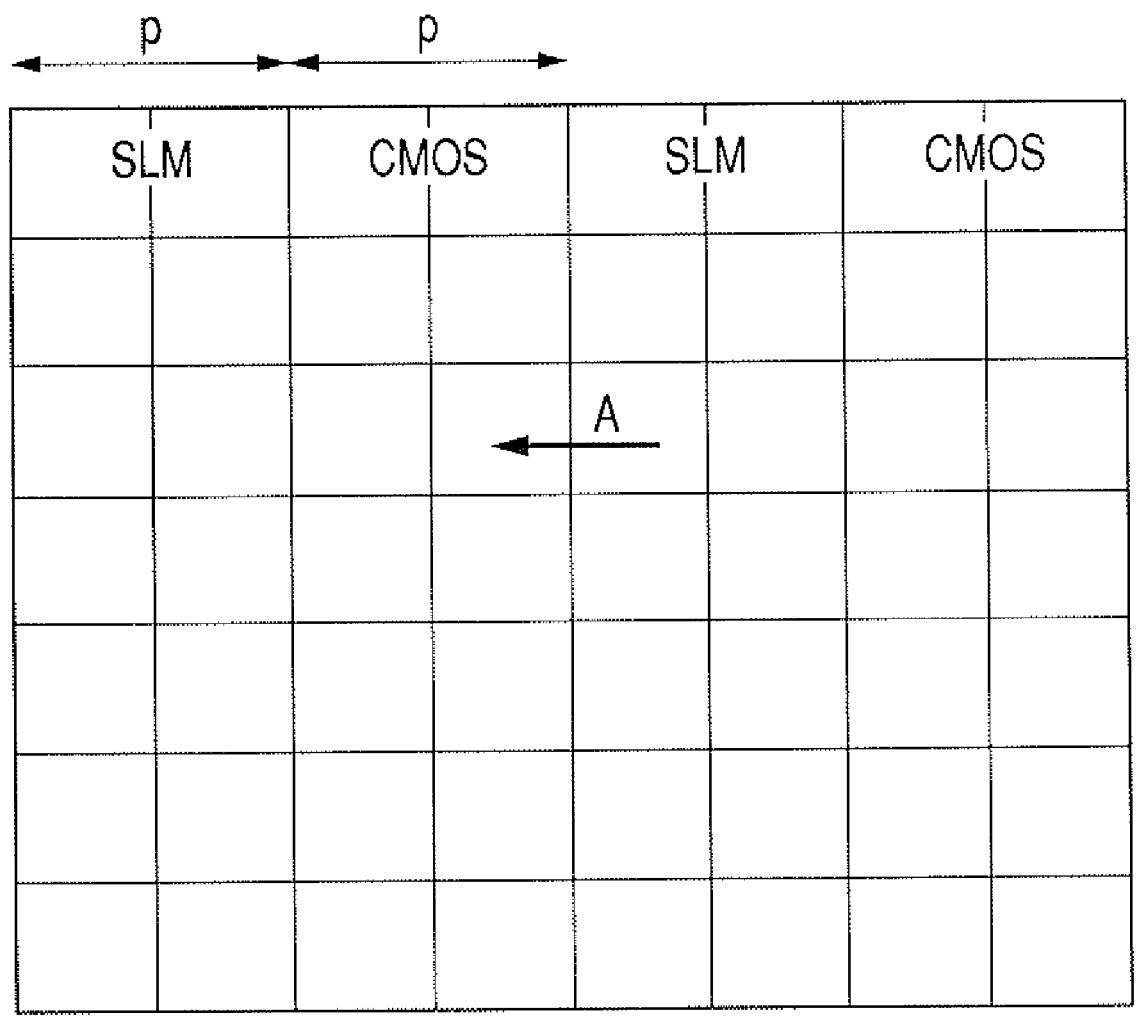
FIG. 19 is a diagram showing an in-plane arrangement of an integrated spatial light modulator and photodetector element (lateral arrangement) according to the present invention.

FIG. 19 shows an exemplary positional relationship between the spatial light modulator SLM and the CMOS sensor on the SLM/CMOS 108. As shown in FIG. 19, the SLM and the CMOS each having the same area and the same shape are filled. The SLM and the CMOS form rows of pixels with a pitch (p) in which the SLM and the CMOS are placed at an equal interval. The direction represented by an arrow A in FIG. 19 corresponds to the shift direction of a light beam. The rows of pixels extend in a direction orthogonal to the direction represented by the arrow A. The pitch (p) is set to be the same as the shift amount (s) of the light beam. Owing to this configuration, a pattern image generated on the SLM during recording becomes incident upon the CMOS sensor shifted only by the pitch (p) during reproduction. Thus, a signal with a satisfactory S/N can be reproduced.

In this embodiment, the shift amount s is set to be the same as the pitch p of the pixel row. However, the shift amount s may be odd-number times as long as the pitch (p), and needless to say, it can be set arbitrarily in accordance with a layout. Further, the parallel plate 125 in the light beam is tilted, however, the parallel plate originally tilted with respect to the light beam may be inserted/removed with respect to the light beam, or a method having a similar effect may also be used.

Embodiment 5

Figure 20:
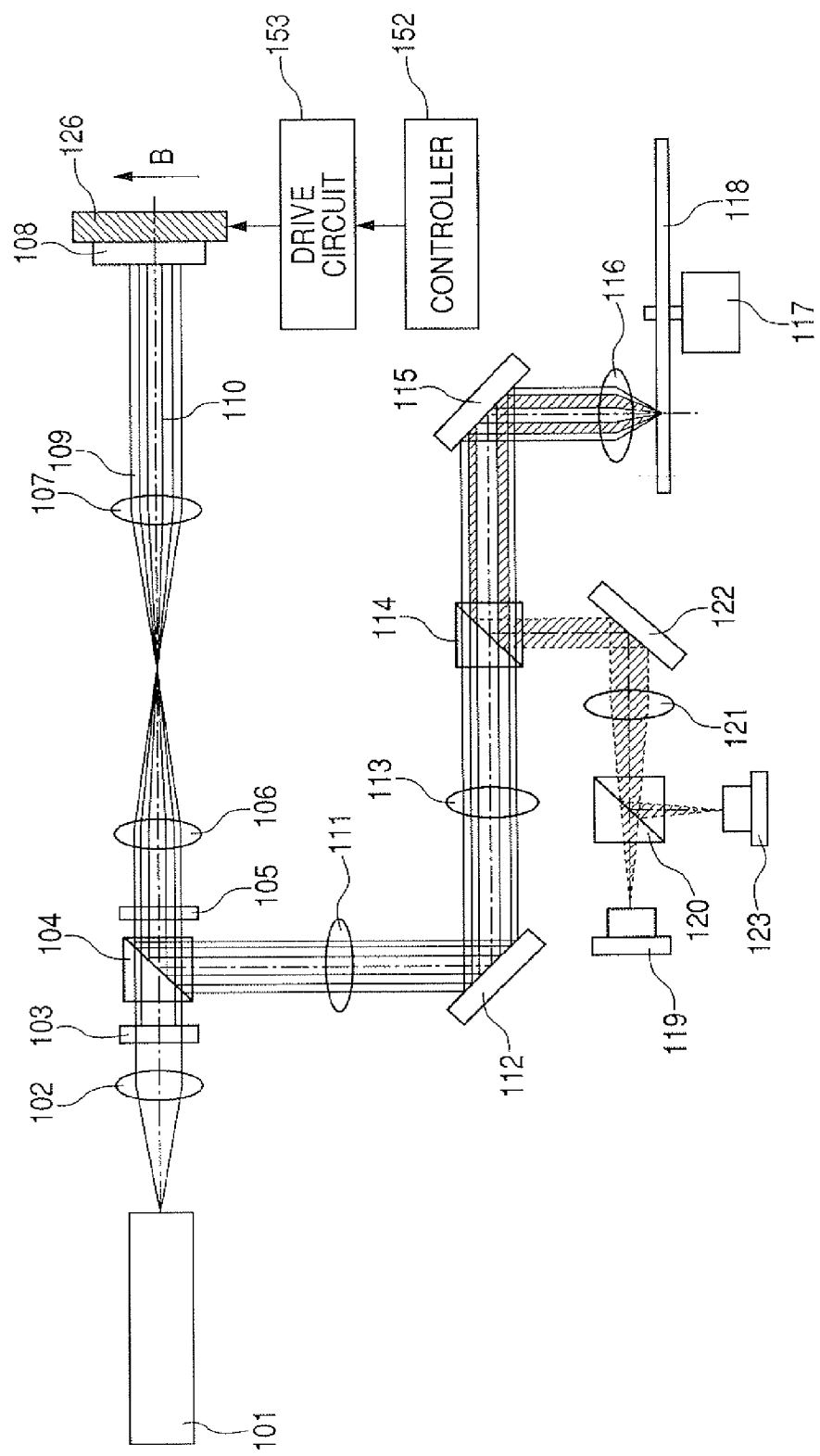
FIG. 20 is a schematic diagram showing an optical system during reproduction according to Embodiment 5.

FIG. 20 shows Embodiment 5 of the present invention. In FIG. 20, the same portions as those in FIGS. 11 to 13 are denoted with the same reference numerals as those therein, and the description thereof will be omitted here. In this embodiment, the parallel plate 125 is omitted from the optical system, and the SLM/CMOS 108 is moved in a direction represented by an arrow B by the drive of the piezoelectric element 126, instead. A pattern image generated on the SLM during recording becomes incident upon the CMOS sensor shifted by a pitch p during reproduction in the same way as in Embodiment 4.

Next, the case where recorded information is reproduced from the hologram disk 118 that is a recording medium will be described. In the following description, parts which are the features of this embodiment will be described. The SLM/CMOS 108 is attached to the piezoelectric element 126, and can move in the direction represented by the arrow B perpendicular to a light beam incident upon the SLM/CMOS 108.

During reproduction, the piezoelectric element 126 is energized with a drive circuit 153 by the control of the controller 152, whereby the SLM/CMOS 108 is moved by a width (p) of the pixel row of the SLM/CMOS 108 in the direction represented by the arrow B with respect to the state of recording (see FIG. 19). Accordingly, a reproduction signal with a satisfactory S/N and a large contrast can be obtained in the same way as in Embodiment 4. During recording, the piezoelectric element 126 is not energized, whereby the SLM/CMOS 108 is not moved.

In this embodiment, the piezoelectric element 126 is used as driving means for the SLM/CMOS 108. However, the present invention is not limited thereto, and the SLM/CMOS 108 can be driven by various other driving means.

As described above, in Embodiments 4 and 5, the drive mechanism, drive circuit, and controller for shifting an incident light beam relatively in parallel to the SLM/CMOS 108 were used.

Embodiment 6

Figure 21:
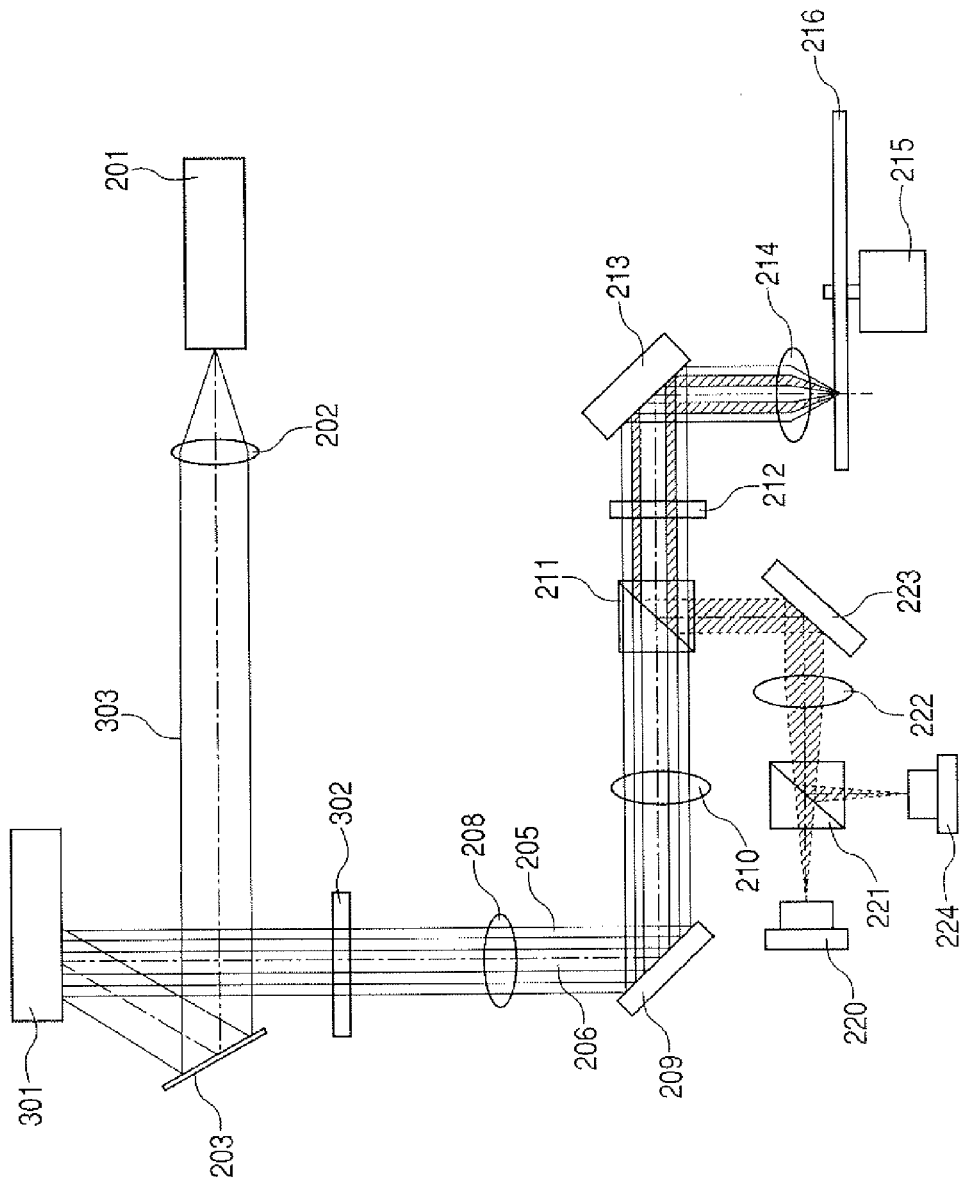
FIG. 21 is a developed diagram showing an optical system in a recording operation according to Embodiment 6.
Figure 22:
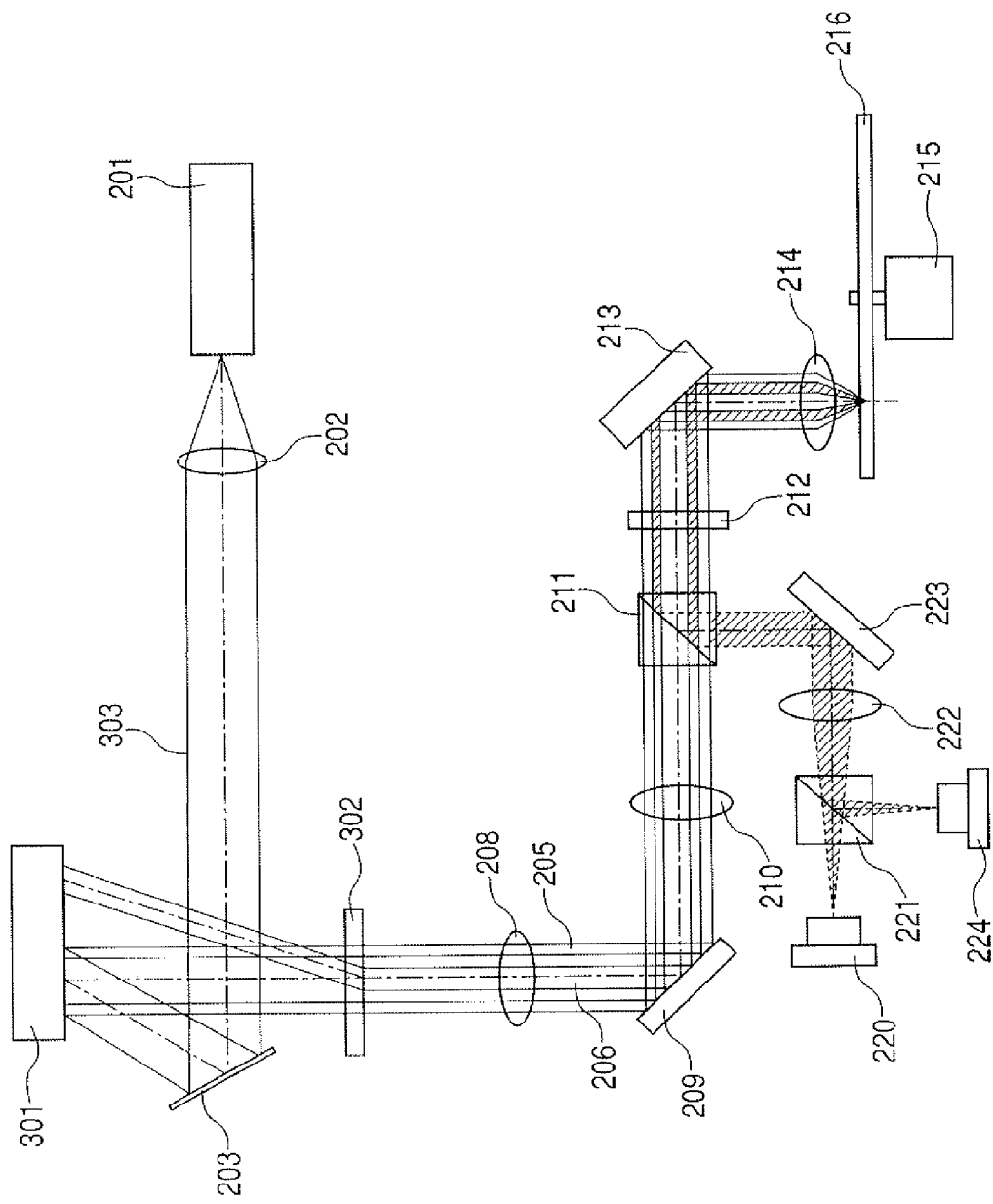
FIG. 22 is a developed diagram showing an optical system in a reproduction operation of an optical pickup apparatus according to Embodiment 6.
Figure 23:
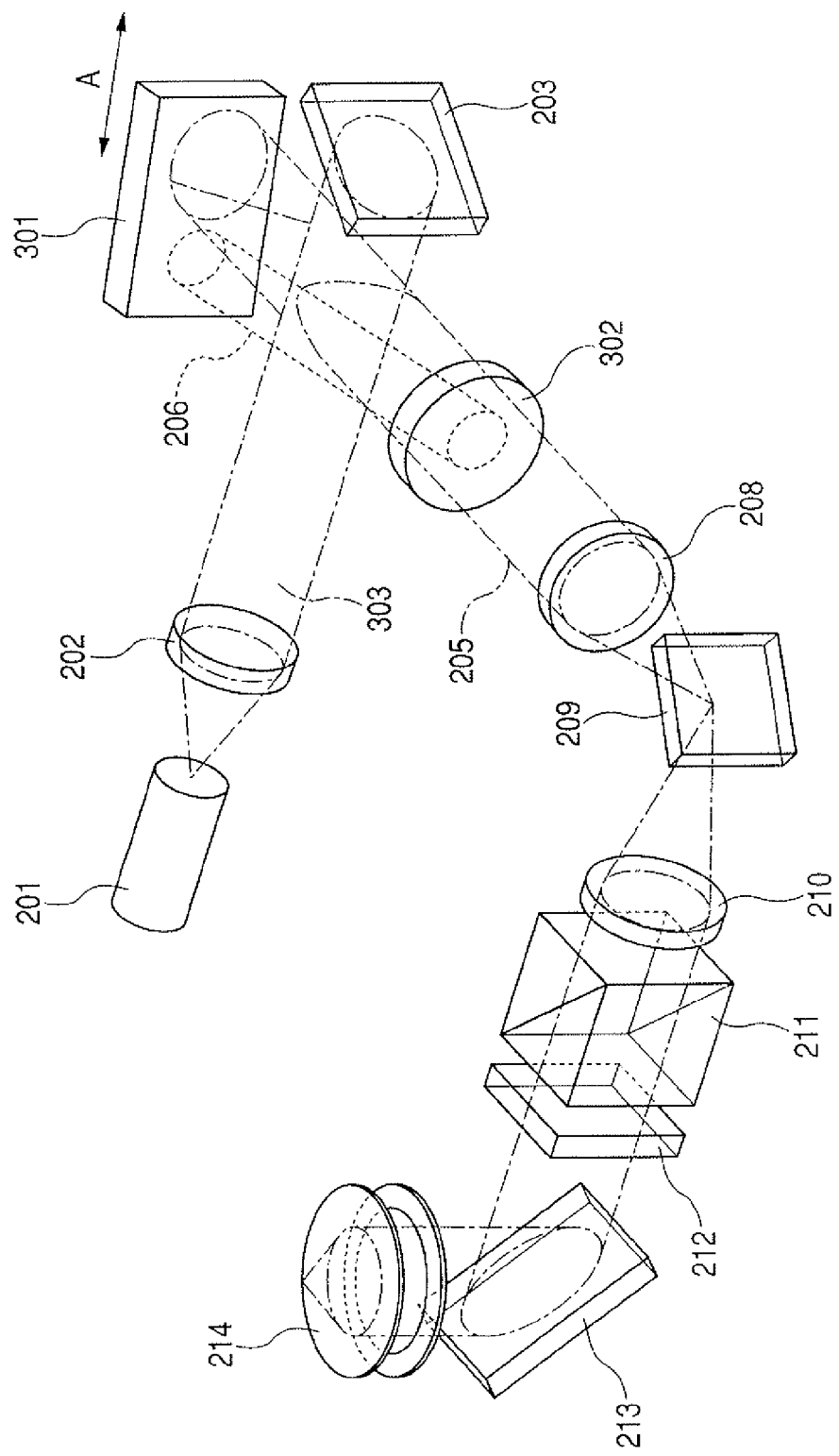
FIG. 23 is a perspective view in the case where an optical system of the optical pickup apparatus shown in FIG. 22 is actually arranged.
Figure 39:
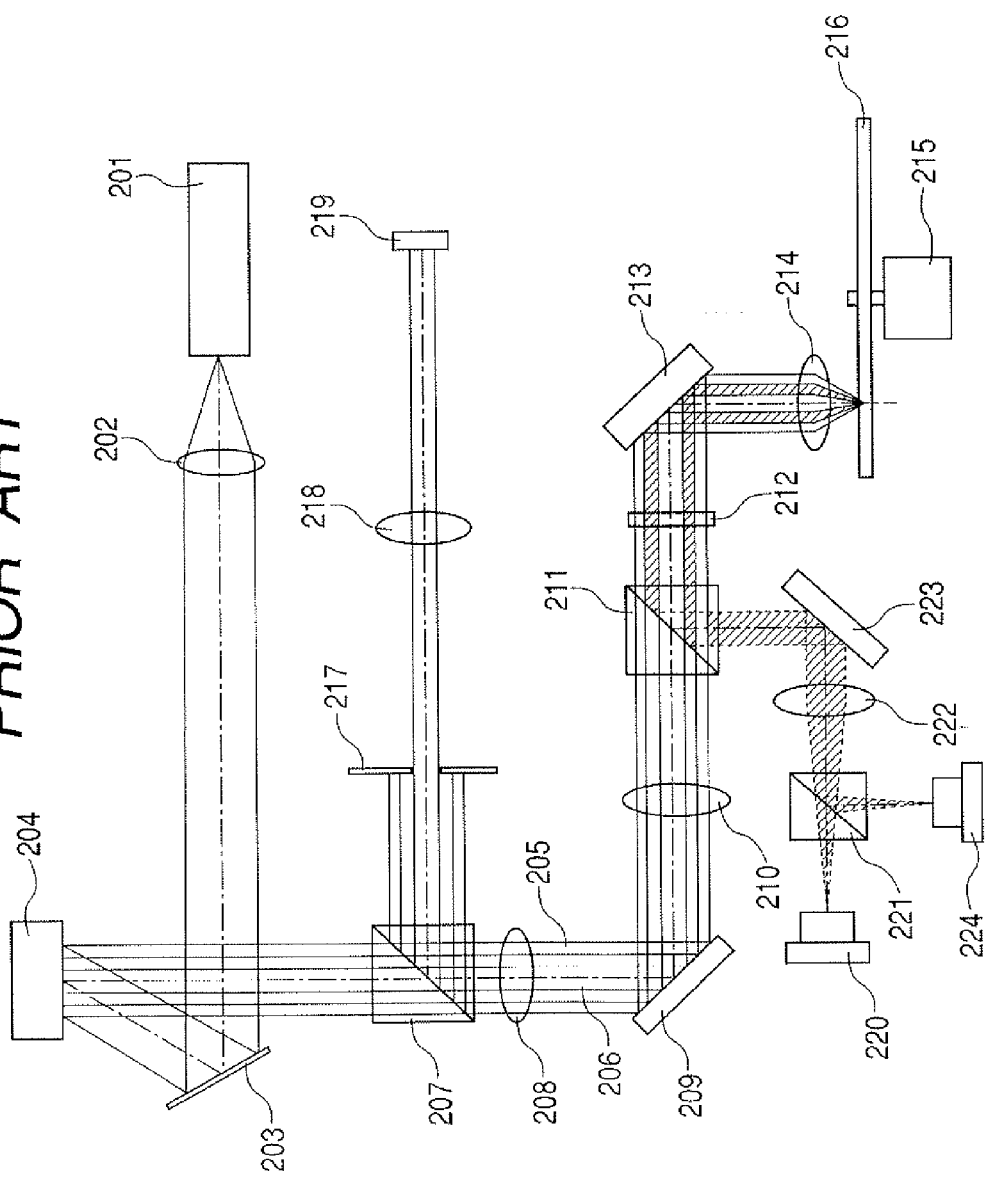
FIG. 39 is a diagram illustrating a conventional holographic memory (collinear system) of a coaxial type.
Figure 40B:
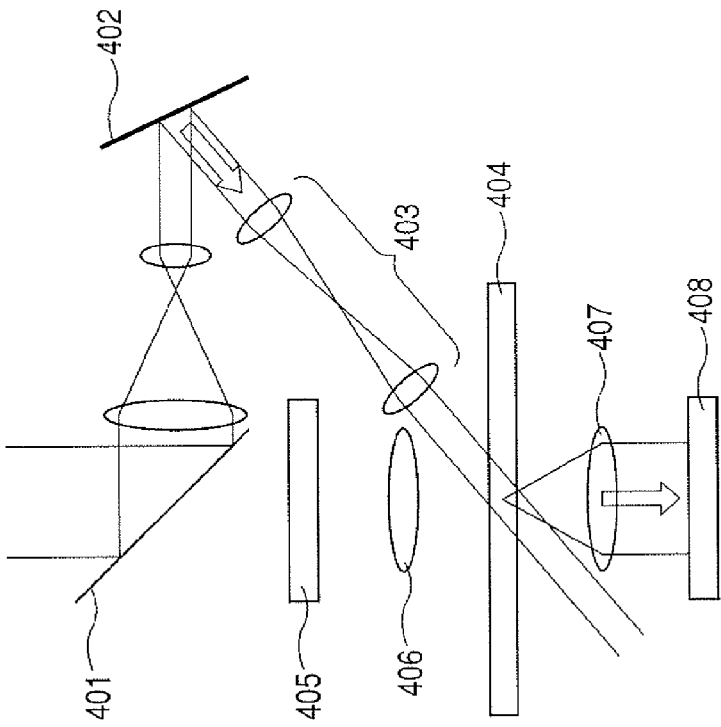
FIGS. 40A and 40B are diagrams each showing an optical path of a conventional two-light beam interference system.
Figure 40A:
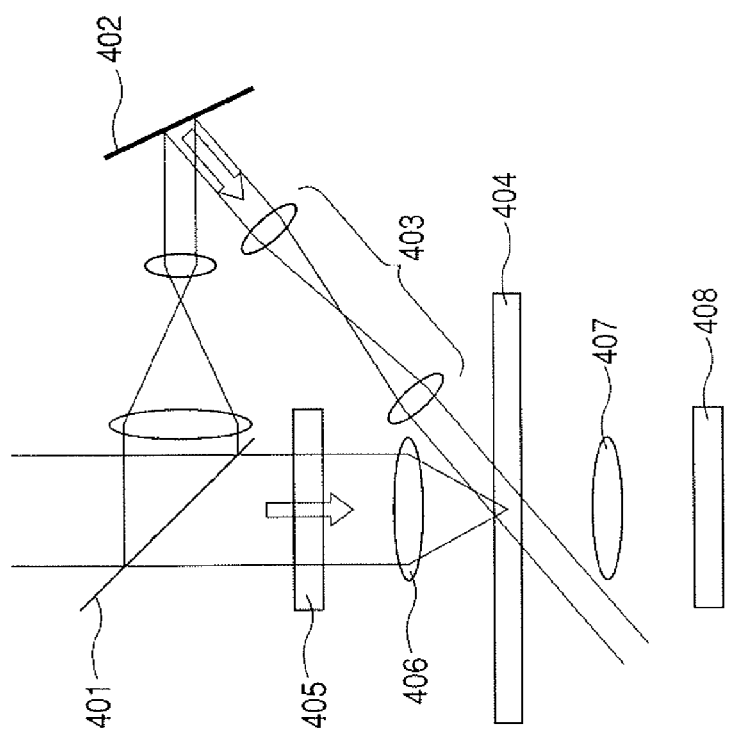
Figure 41A:
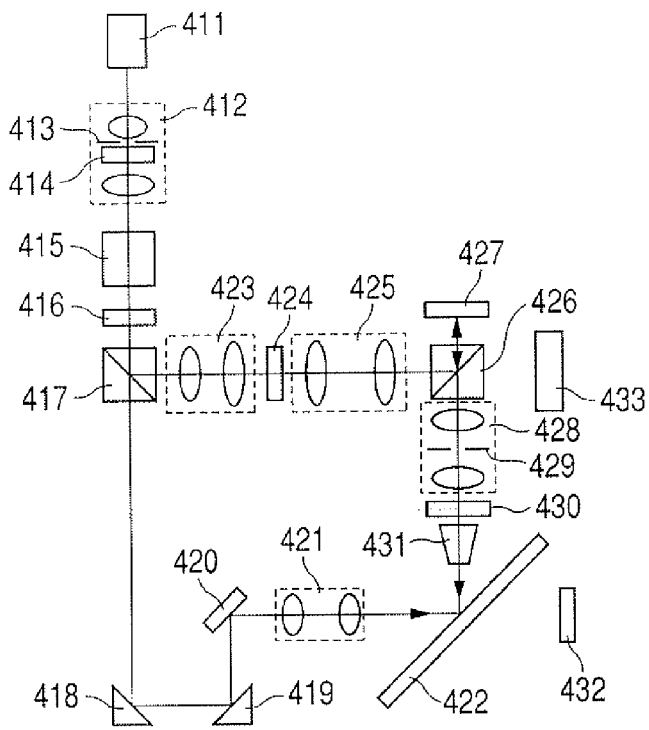
FIGS. 41A and 41B are block diagrams each showing an optical system of a conventional two-light beam interference system has been proposed so as to miniaturize the apparatus.
Figure 41B:
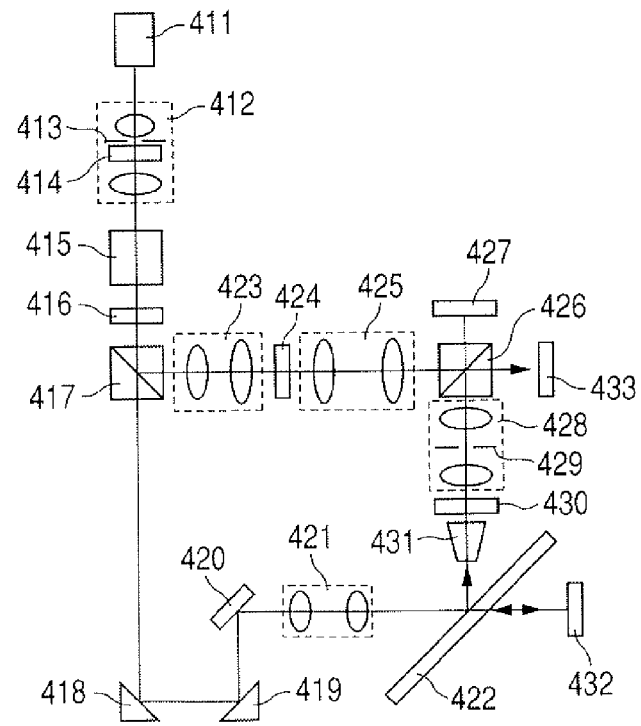

FIGS. 21 and 22 are diagrams each showing an optical pickup of an optical information recording and reproducing apparatus according to Embodiment 6. FIG. 21 is a developed diagram of an optical system for a recording operation, and FIG. 22 is a developed diagram of an optical system for a reproduction operation. Further, FIG. 23 is a perspective view in the case where the optical system for a reproduction operation in FIG. 22 is placed as an actual optical pickup apparatus. The basic configuration thereof is the same as that of a conventional optical system shown in FIG. 39, so in FIGS. 21 to 23, the same portions as those in FIG. 39 are denoted with the same reference numerals as those therein.

Further, in FIG. 23, the hologram disk 216 that is a hologram medium and an optical component for performing an optical servo technique using a red laser in a conventional example are omitted. Further, since FIGS. 21 and 22 are developed diagrams schematically showing each optical element, in FIGS. 21, 22, and 23, the phase of each optical element with respect to an optical axis is varied.

Further, in this embodiment, the circuits such as a reproduction circuit for recording information, a recording circuit for reproducing information, or a servo control circuit, a mechanism such as a controller for controlling the entire apparatus, and the like are omitted, because they are known conventionally.

Figure 24:
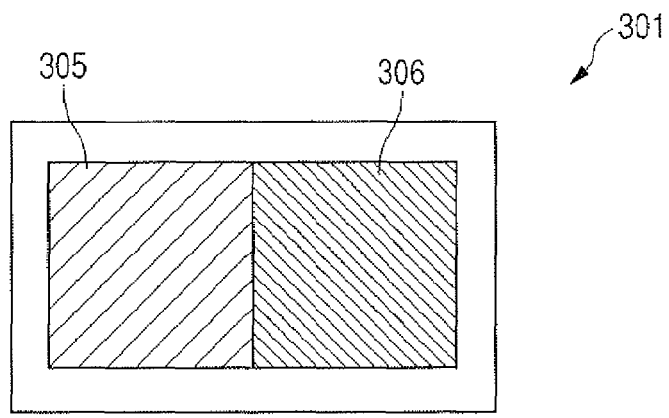
FIG. 24 is a plan view showing an SLM/CMOS used in Embodiment 6.

FIG. 24 shows an SLM/CMOS 301 used in Embodiment 6. In the SLM/CMOS 301, an SLM 305 that is a spatial light modulator and a CMOS 306 that is a photodetector element are placed integrally so as to be adjacent to each other on the same plane on the same substrate (semiconductor substrate). Further, a polarization hologram element 302 that is a polarization splitter is placed between the SLM/CMOS 301 and the relay lens (1) 208.

Further, as shown in FIG. 23, the SLM/CMOS 301 is placed in a plane orthogonal to a disk surface (not shown in FIG. 23) of the hologram disk 216. Further, the SLM 305 in which the spatial light modulator is placed and the CMOS 306 in which the photodetector element is placed are disposed in parallel (in a direction represented by an arrow A in FIG. 23) to the hologram disk surface. Such the configuration enables the apparatus to be thinned.

Figure 25:
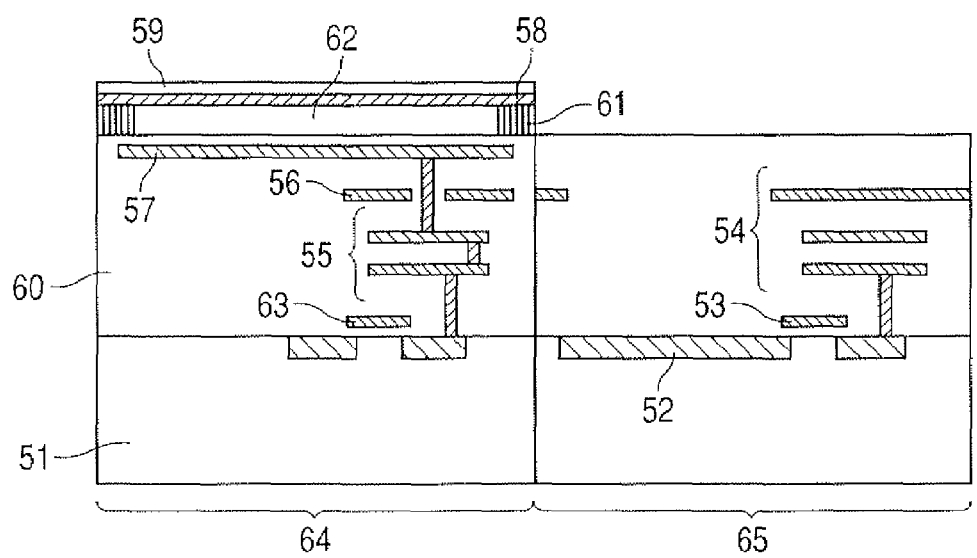
FIG. 25 is a cross-sectional view of an element in which a light interference type spatial modulating element and photodetector element CMOS sensor used in Embodiment 6 are arranged laterally.

Next, the light interference type SLM/CMOS 301 integrally configured will be described. FIG. 25 is a cross-sectional view of a device in which a light interference type spatial light modulator SLM and a photodetector element CMOS sensor are placed laterally. FIG. 25 shows a configuration of one pixel of the spatial light modulator SLM and the photodetector element CMOS sensor.

In FIG. 25, reference numeral 51 denotes a Si substrate, 52 denotes a photodiode, 53 denotes a transfer transistor of a CMOS sensor, 54 denotes a CMOS sensor wiring, 55 denotes a SLM element wiring, 56 denotes a light-shielding film, 57 denotes a light interference mirror A, and 58 denotes a light interference mirror B. Further, reference numeral 59 denotes an outermost surface protective film, 60 denotes an interlayer film, 61 denotes a support, 62 denotes a gap, and 63 denotes a SLM data transmitting switch. An interlayer insulator, other Tr wirings of a CMOS sensor, and Tr wirings for writing of the SLM are omitted.

Further, reference numerals 54, 55, and 56 denote underlying wiring layers, and the underlying wiring layer (light-shielding film) 56 is used for preventing incident light from reaching a lower transistor region. Reference numeral 64 denotes a region of an SLM element that is a spatial light modulator, and 65 denotes a region of a CMOS sensor that is a photodetector element.

In this embodiment, it is necessary that a light interference mirror B 58 using a transmission mode is semi-transparent. However, since the light interference portion does not need to use a transmission mode, it is not necessary that a light interference mirror A 57 is semi-transparent.

For example, Ti is used for a semi-transparent mirror; however, the present invention is not limited thereto. In the case where the mirror is not semi-transparent, a material with a high reflectance is preferable, and a metal film made of Al, AlSi, AlCu, Ti, Ta, W, Ag, Pt, Ru, Ni, Au, TiN, or the like, or a compound film made of any of these metals is used. However, the present invention is not particularly limited.

Further, reference numeral 61 denotes a support insulating film on a reflective electrode, which is made of, for example, a silicon nitride film. Reference numeral 59 denotes a protective film of a semi-transparent film, which is made of, for example, a silicon oxide film. Insulating films 59, 60, and 61 may be made of different materials or made of the same material. As long as they are made of an insulating material, there is no electrical problem, so the present invention is not particularly limited.

Next, the operation of the interference portion will be described. First, the light interference mirror B 58 of Ti is supplied with a ground potential of 0 V. Then, the light interference mirror A 57 of Ti is supplied with a voltage, whereby the air gap is adjusted by the Coulomb force of the light interference mirrors A and B.

Figure 26:
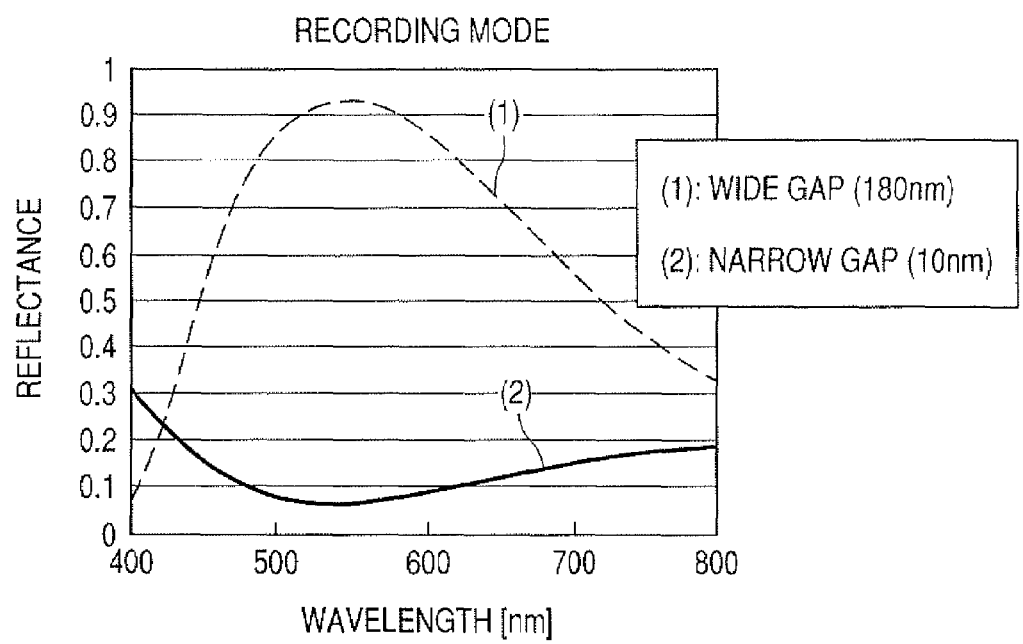
FIG. 26 is a graph showing an example of spectral reflectance characteristics of an SLM/CMOS used in Embodiment 6.

FIG. 26 illustrates an example of spectral reflectance characteristics of the spatial-light-modulating/photodetector element 301. FIG. 26 shows reflectances in a wide gap and a narrow gap with a layer configuration of an outermost surface protective film 59 ($SiO_2$: 10 nm), a light interference mirror B 58 (Ti: 5 nm/$Si_3N_4$: 20 nm/$SiO_2$: 10 nm/$Si_3N_4$: 20 nm), a gap 62 (180 nm in the case of a wide gap, and 10 nm in the case of a narrow gap), and a light interference mirror A 57 (AlSi: 10 nm ($SiO_2$: 10 nm on the surface)).

For a light with a wavelength of 550 nm, the reflectances at air gaps of 180 nm and 10 nm are 93.0% and 0.6% respectively. It is understood that, when the air gap is changed from 10 nm to 180 nm by the voltage supplied to the light interference mirror A 57, the reflectance is changed largely accordingly. The interference function can be designed depending upon the wavelength, semi-transparent film material, and air gap thickness, and it is important to design a required configuration considering the characteristics such as physical strength and contrast ratio.

Next, an operation in the case where recording is performed with respect to the hologram disk 216 will be described using FIG. 21. A basic recording method is the same as that described above.

Reference light 205 and information light 206 reflected by a pixel representing information "1" by an SLM 305 of an SLM/CMOS 301 are transmitted through a polarization hologram element 302 as P-polarized light, and are directed to a hologram disk 216 via a relay lens (1) 208, a mirror 209, a relay lens (2) 210, and a dichroic BS 211. At this time, the reference light 205 and the information light 206 transmitted through a quarter wavelength plate QWP 212 and converted into circular polarized light (e.g., clockwise circular polarized light) are reflected by a mirror 213 to be incident upon an objective lens 214 at a focal length f.

A pattern displayed on the SLM 305 by the two relay lenses (1) 208 and (2) 210 forms an intermediate image at a distance f before the objective lens 214. Consequently, a so-called 4f optical system in which a pattern image (not shown) on the SLM, the objective lens 214, and the hologram disk 216 are placed with an interval f from each other is configured. The hologram disk 216 is held rotatably on the spindle motor 215.

The reference light 205 and the information light 206 are condensed on the hologram disk 216 by the objective lens 214, and interfere with each other to form an interference fringe. On a polymer material in the hologram disk 216, an interference fringe pattern during recording is recorded as a refractive index distribution, and a digital volume hologram is formed. Further, a reflective film is provided in the hologram disk 216. The description of the optical servo means for allowing an optical spot to follow the hologram disk 216 is omitted, since it is similar to that in the conventional example.

Next, an operation in the case where recorded information is reproduced from the hologram disk 216 will be described using FIG. 22. A light beam outputted from the green laser 201 of a light source illuminates the SLM 305 of the SLM/CMOS 301. During reproduction, only a portion for modulating the reference light 205 on the SLM 305 displays information "1", and a portion for modulating the information light 206 displays information "0". Thus, only the light reflected by the pixel in the portion of the reference light is reflected to the hologram disk 216, and the information light is not reflected to the hologram disk 216.

In the same way as that in recording, the reference light 205 becomes circular polarized light (e.g., clockwise circular polarized light) to be condensed onto the hologram disk 216, and reproduces information light from the recorded interference fringe. Information light reflected by the reflective film in the hologram disk becomes reverse circular polarized light (e.g., counterclockwise circular polarized light) to be incident upon the objective lens 214 again and collimated.

Further, the light beam is reflected by the mirror 213 and transmitted through the quarter wavelength plate QWP 212, and is converted into a linear polarized light beam (S-polarized light) perpendicular to the polarization direction of the forwarding path. At this time, an intermediate image of a display pattern of the SLM 305 reproduced at the distance f from the objective lens 214 is formed.

The light beam transmitted through the dichroic BS 211 passes through the relay lens (2) 210, the mirror 209, and the relay lens (1) 208 to be directed to the polarization hologram element 302 as S-polarized light. The light beam diffracted and deflected by the polarization hologram element 302 is guided to the CMOS 306 of the SLM/CMOS 301 shown in FIG. 24, and reproduces recorded information.

With such a configuration, the illumination light 303 and the reproduced information light 206 can be separated from each other so as not to degrade the S/N, and a spatial light modulator and a photodetector element can be configured integrally. Consequently, an optical system can also be miniaturized.

Figure 27:
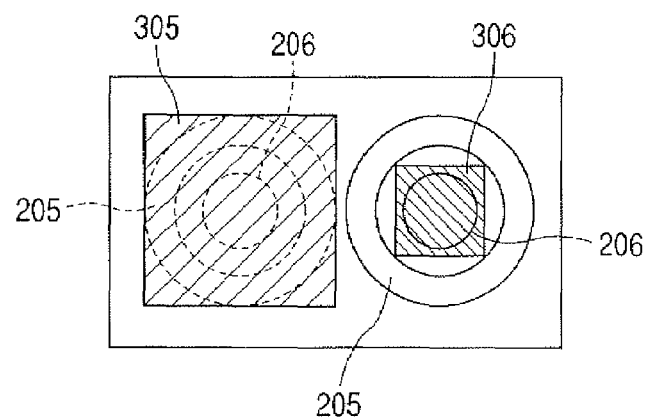
FIG. 27 is a diagram showing a positional relationship in the case where a CMOS region of the SLM/CMOS according to Embodiment 6 is arranged in a region where information light is irradiated.

Further, as shown in FIG. 27, it is also possible that the CMOS 306 is placed only in a region that is irradiated with the information light 206. Accordingly, during reproduction, the unwanted reference light reflected by the hologram disk 216 is not incident upon the CMOS 306, whereby a reproduced signal with a better S/N can be obtained.

The polarization hologram element 302 is placed between the SLM/CMOS 301 and the relay lens (1) 208. However, the present invention is not limited thereto.

Embodiment 7

Figure 28:
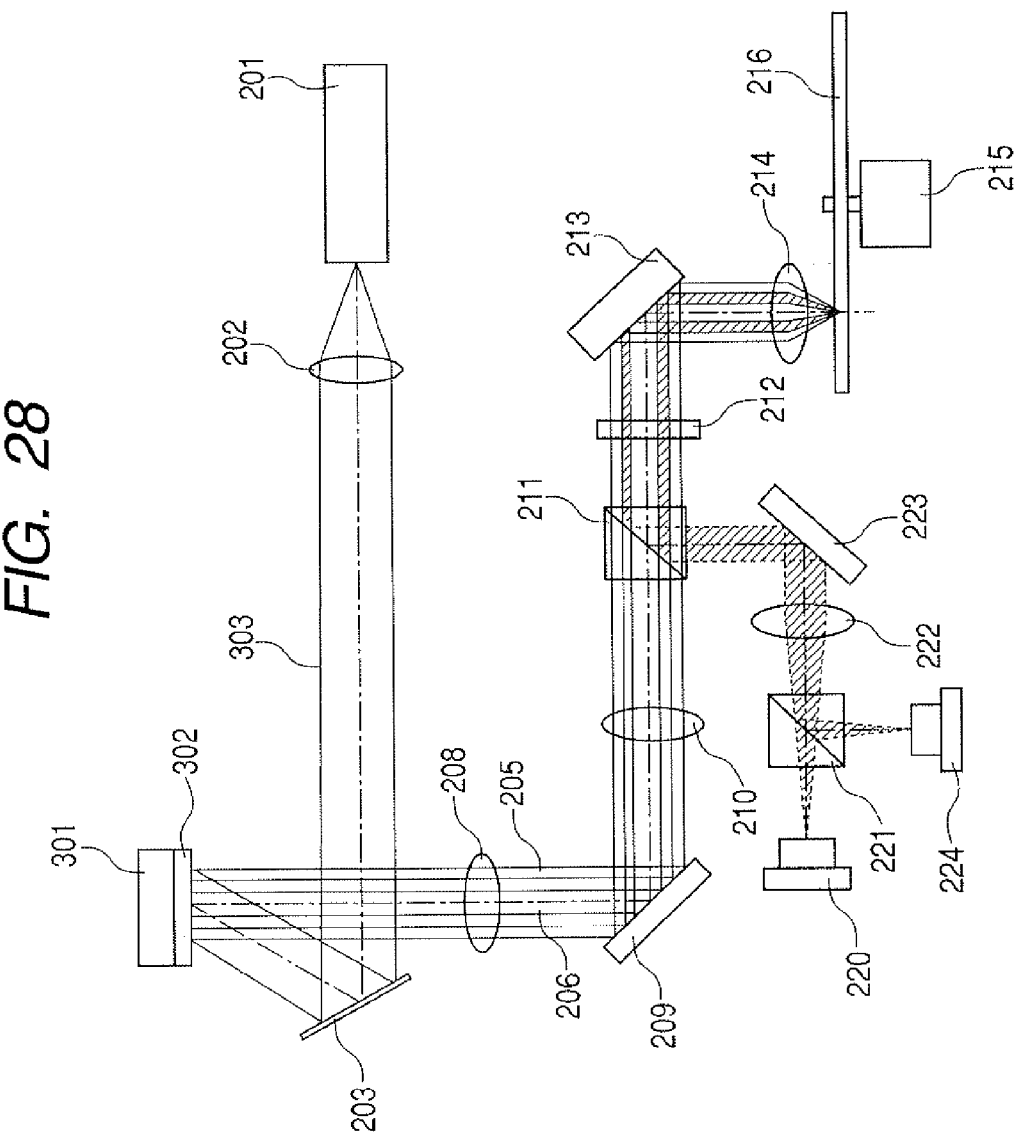
FIG. 28 is a developed diagram showing an optical system of an optical pickup apparatus according to Embodiment 7.
Figure 29:
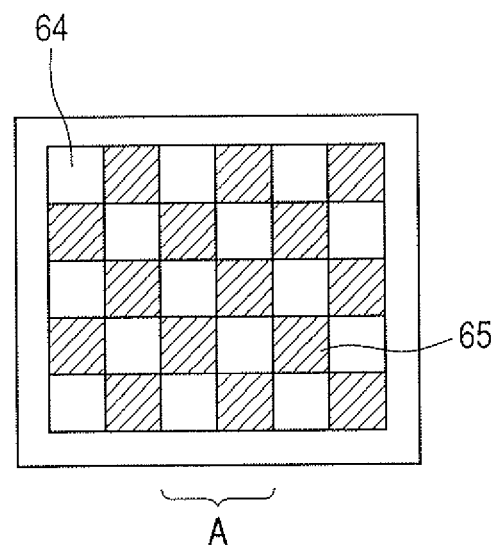
FIG. 29 is a diagram showing an SLM/CMOS used in Embodiment 7.

FIGS. 28 to 31 are diagrams illustrating Embodiment 7 of a collinear holographic memory optical system according to the present invention. FIG. 28 is a developed diagram of an optical system of an optical pickup, and FIG. 29 shows an SLM region and a CMOS region of the SLM/CMOS 301.

Figure 30:
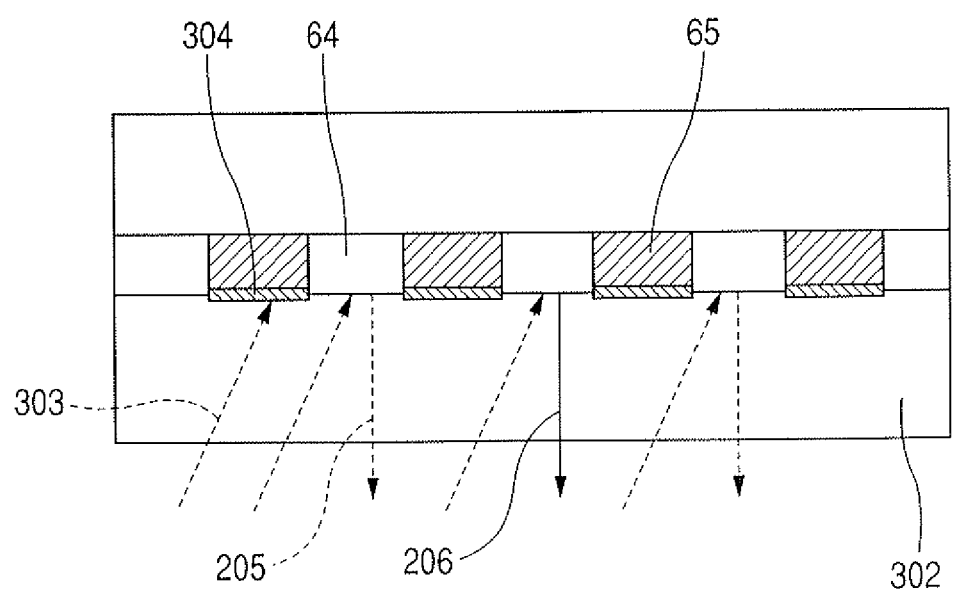
FIG. 30 is a cross-sectional diagram showing a state of the reference light and the information light during a recording operation of the SLM/CMOS configured integrally with a polarization hologram element used in Embodiment 7.
Figure 31:
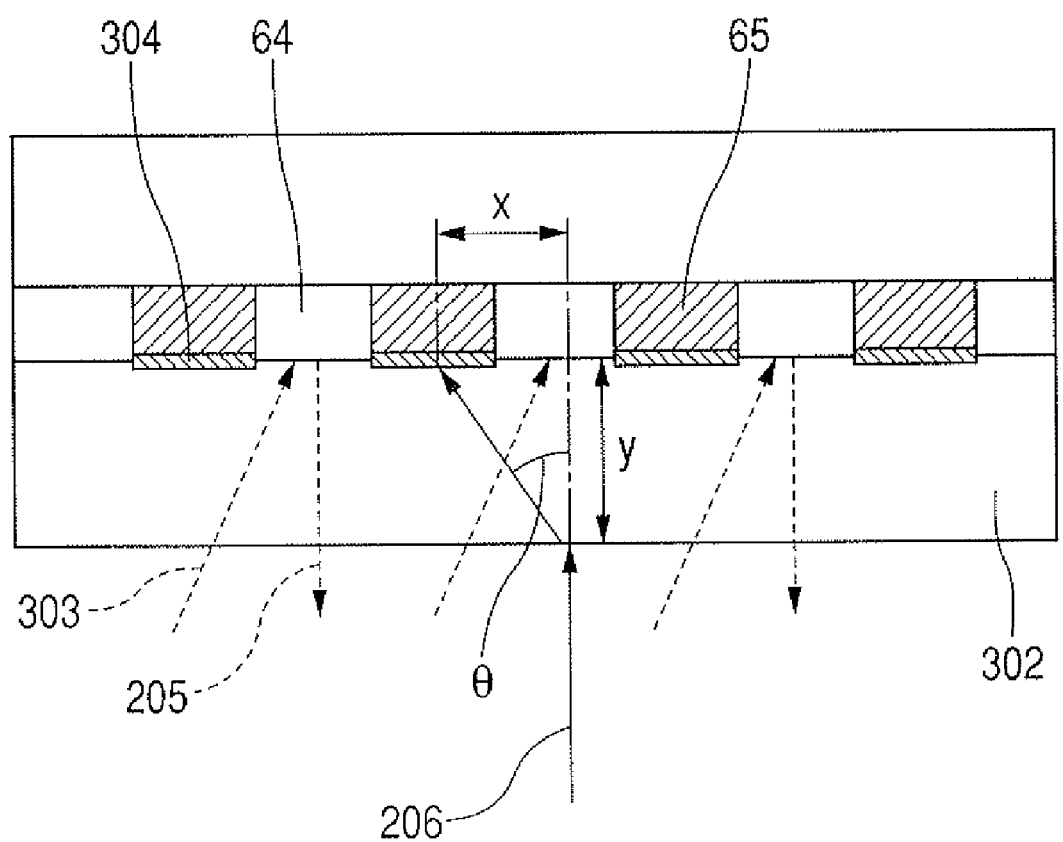
FIG. 31 is a cross-sectional diagram showing a state of the reference light and the information light during a reproduction operation of the SLM/CMOS configured integrally with a polarization hologram element used in Embodiment 7.

FIG. 30 is a cross-sectional view showing a state of reference light and information light of the SLM/CMOS 301 during a recording operation. FIG. 31 is a cross-sectional view showing a state of reference light and information light of the SLM/CMOS 301 during a reproduction operation. The basic configuration and operation are the same as those of Embodiment 6, so the detailed description thereof will be omitted.

Further, even in this embodiment, the circuits such as a reproduction circuit and a recording circuit for recording or reproducing information, a servo control circuit, and a controller for controlling an entire apparatus, a mechanism, and the like are known, so an explanation thereof will be omitted.

In this embodiment, as shown in FIG. 29, pixels constituting SLM regions 64 and CMOS regions 65 respectively on the same substrate are arranged alternately in a horizontal direction and a vertical direction, and pixels constituting the SLM regions 64 and the CMOS regions 65 are arranged in a checkered pattern.

Further, as shown in FIGS. 30 and 31, in an SLM/CMOS 301, a polarization hologram element 302 is integrally formed on the SLM regions 64 and the CMOS regions 65. Further, on the CMOS regions 65, polarizing filters 304 are provided.

The above-mentioned configuration will be described with reference to FIG. 31. As shown in FIG. 31, in the reproduction operation described later, it is assumed that an angle at which the information light 206 is diffracted by the polarization hologram element 302 and deflected is θ, and a distance between a light receiving plane of the CMOS region 65 and a plane on which the information light 206 is deflected by the polarization hologram element 302 is y. At this time, a displacement x between the optical axis before deflection in the direction orthogonal to y and the optical axis at a time when a light beam reaches the CMOS region 65 is represented by x=y·tan θ. Therefore, x corresponds to the pitch of the respective pixels of the SLM region 64 and the CMOS region 65. Thus, in order to integrate the polarization hologram element 302 and the SLM/CMOS 301 in a small size (set y to be small), it is desirable that the respective pixels are arranged alternately in the horizontal direction and the vertical direction as shown in FIG. 29. However, in a case where y and θ are sufficiently large, for example, the arrangement of the SLM 305 and the CMOS 306 as shown in FIG. 24 may be used.

In the SLM/CMOS 301 in which the polarization hologram element 302 is configured integrally, for example, by using a resin or a glass having polarization characteristics as a material for sealing a chip in which the SLM region 64 and the CMOS region 65 are formed, the above-mentioned arrangement can be realized easily.

Next, a recording operation will be described in detail with reference to FIGS. 28 and 30. In the same way as in Embodiment 6, the illumination light 303 directed to the spatial light SLM/CMOS element 301 as P-polarized light is transmitted through the polarization hologram element 302 placed on the SLM/CMOS 301, and illuminates the SLM region 64.

At this time, in the same way as in Embodiment 6, the reference light 205 and the information light 206 reflected by a pixel representing the information "1" on the SLM region 64 are transmitted through the polarization hologram element 302 again as P-polarized light, and is guided to the relay lens (1) 208. The optical system, servo system, and the like after the relay lens (1) 208 are the same as those of Embodiment 6, and the description of the subsequent recording operation will be omitted.

Next, a reproduction operation will be described in detail with reference to FIGS. 28 and 31. In the same way as in Embodiment 6, the illumination light 303 directed to the SLM/CMOS 301 as P-polarized light is transmitted through the polarization hologram element 302 placed on the SLM/CMOS 301, and illuminates the SLM region 64. The reference light 205 reflected by the pixel representing the information "1" on the SLM region 64 is transmitted through the polarization hologram element 302 again as P-polarized light, and is guided to the hologram disk 216 in the same way as in Embodiment 1.

The information light 206 reproduced from the hologram disk 216 is transmitted through the dichroic BS 211 as S-polarized light, and is directed to the polarization hologram element 302 via the relay lens 2 (210), the mirror 209, and the relay lens 1 (208).

At this time, the information light 206 incident upon the polarization hologram element 302 is diffracted and deflected by the polarization hologram element 302, and is guided to the CMOS region 65 of the SLM/CMOS element 301, as shown in FIG. 31. Recorded information is reproduced from the output of the CMOS region 65.

Herein, in the arrangement of the SLM region 64 and the CMOS region 65 shown in FIG. 29, the respective pixels are adjacent to each other, so the CMOS region 65 receiving the information light 206 is also irradiated with the illumination light 303 for generating the reference light 205. In this embodiment, as shown in FIGS. 30 and 31, the polarizing filter 304 for transmitting only the S-polarized light is placed on the CMOS region 65.

With the above-mentioned configuration, the influence by the illumination light 303 that is P-polarized light is removed, and the information light 206 diffracted and deflected as S-polarized light can be received in the CMOS region 65. In the case where the illumination light is radiated as S-polarized light, the polarization direction in which the illumination light is diffracted by the polarization hologram element 302 is P-polarized light, so the same effect can be obtained by placing a polarizing filter for transmitting only P-polarized light.

In Embodiment 7, the polarization hologram element 302 and the SLM/CMOS 301 are integrally formed, so each positional precision can be obtained satisfactorily as compared with Embodiment 6. Further, it is also possible to reduce the number of parts, so the time for assembly can be reduced, and costs can be reduced.

Further, in the same way as in Embodiment 6, only the pixels in a region irradiated with the information light 206 can be set to be the CMOS 306. For example, as shown in FIG. 29, the SLM regions 64 and the CMOS regions 65 are placed alternately with respect to the A region in the vicinity of the center. In the remaining region, only the SLM regions 64 are placed. Accordingly, the unwanted reference light reflected by the hologram disk 216 is not incident, whereby a reproduced signal with a better S/N is obtained during reproduction.

The present invention is not limited to the above-mentioned embodiment. For example, not only a green laser but also a blue violet semiconductor laser that has been put into practical use recently may be used as a light source for holography. Further, not only a disk-shaped medium but also a card-shaped medium can also be used as the hologram medium. Further, as the spatial light modulator, a digital mirror device (DMD) can also be used.

Embodiment 8

Figure 32A:
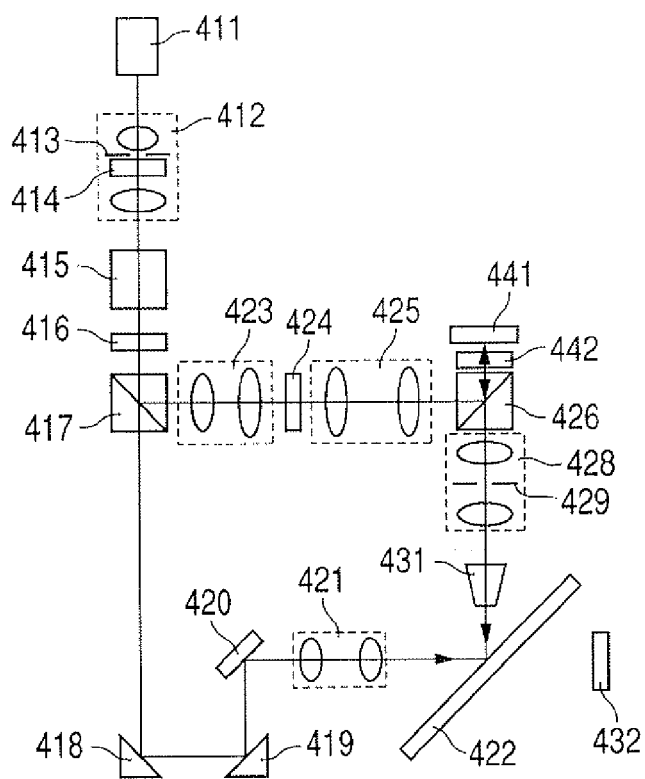
FIGS. 32A and 32B are diagrams each showing an optical path of an optical information recording and reproducing apparatus according to Embodiments 8 and 9.
Figure 32B:
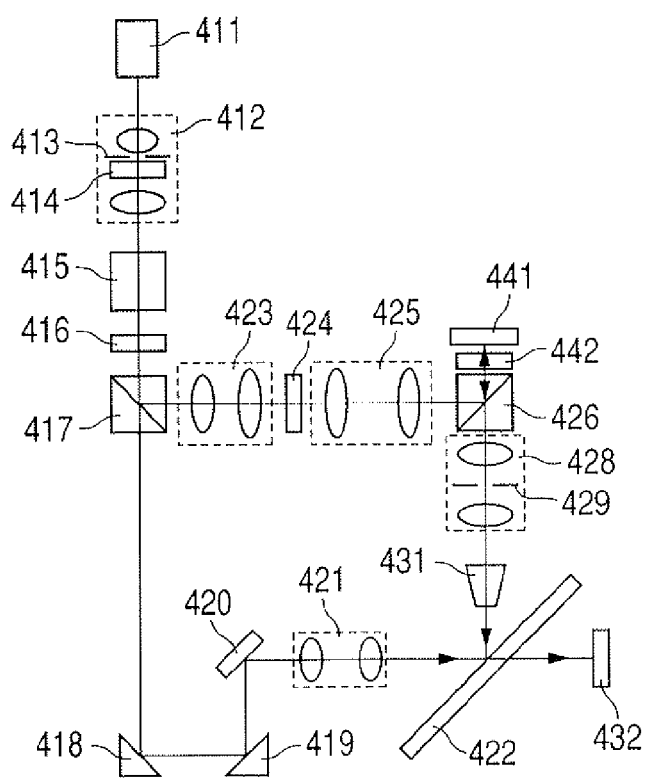

FIGS. 32A and 32B are diagrams each showing an optical path of an optical information recording and reproducing apparatus for recording a hologram on a recording medium by allowing two light beams to interfere with each other according to Embodiment 8.

FIG. 32A shows the operation at a time of recording, and FIG. 32B shows that at a time of reproduction.

First, the operation at a time of recording will be described.

Among the light beams from a laser light source 411, a light beam transmitted through a PBS 417 becomes reference light, is reflected by a mirror 418, a mirror 419, and a galvanometer mirror 420, and is guided to a scanning lens 421. The scanning lens 421 irradiates a hologram recording medium 422 with the reference light.

Herein, an expander 412 aligns light beam diameters to a desired diameter. A pin-hole 413 is a spatial filter for adjusting wavefronts. A shutter 414 is prepared for controlling the exposure time during recording. An apodizer 415 is a filter for making the intensity distribution of light beams to be uniform in a plane. A half wavelength plate 416 is variable in rotation, and changes the polarization direction of a light beam incident upon the PBS 417 during reproduction described later so as to prevent light transmitted through the PBS 417 from being generated.

On the other hand, among the light beams from the laser light source 411, a light beam reflected by the PBS 417 is reflected by a PBS 426, and is incident upon an SLM/CMOS sensor integrated element 441 (hereinafter, referred to as "SLM/CMOS 441"). The incident light beam is reflected by being subjected to two-dimensional modulation corresponding to predetermined information due to the spatial modulation function of the SLM/CMOS 441, and has its polarization direction changed to become information light. The reflected light beam is transmitted through the PBS 426, and the objective lens 431 irradiates the hologram recording medium 422 with the reference light.

Herein, the expander 423 has a function of adjusting the diameters of light beams to be the information light. A phase mask 424 is a filter for enhancing the uniformity of the intensity distribution of light in the hologram recording medium condensed by the objective lens. A relay lens 425 overlaps a two-dimensional pattern image of the phase mask 424 on the SLM/CMOS 441. A relay lens 428 forms an image of a two-dimensional pattern by the spatial modulating function portion of the SLM/CMOS 441 on which the two-dimensional pattern image of the phase mask 424 is overlapped, on an incident side focal plane of the objective lens 431. A quarter wavelength plate 442 changes the light incident upon the SLM/CMOS 441 to circular polarized light, and changes the light reflected by the SLM/CMOS 441 to linear polarized light transmitted through the PBS 426. A polytopic filter 429 is an aperture for restricting the mixing of reproduced light from an outside of a desired hologram during hologram reproduction described later.

Next, the operation at a time of reproduction will be described.

During reproduction, the polarization direction of a light beam from the laser light source 411 is changed by the half wavelength plate 416, whereby the light beam is prevented from being reflected by the PBS 417. The light beam transmitted through the PBS 417 is reflected by the mirror 418, the mirror 419, and the galvanometer mirror 420, and is guided to the scanning lens 421 to be irradiated to the hologram recording medium 422 by the scanning lens. At this time, although diffracted light due to a hologram recorded on the hologram recording medium 422 is generated, the diffracted light is not used as information reproducing light.

The light beam transmitted through the hologram recording medium 422 is reflected by the galvanometer mirror 432, and becomes incident upon the hologram recording medium 422 as reference light. The incident angle of the reference light with respect to the hologram recording medium 422 is controlled by the galvanometer mirror 420 and the galvanometer mirror 432.

The reference light irradiated to the hologram recording medium 422 generates diffracted light due to the hologram recorded on the hologram recording medium 422 to become information reproducing light. The information reproducing light is collected by the objective lens 431, and the information reproducing light other than the information reproducing light corresponding to the reference light incident angle controlled by the galvanometer mirror 420 and the galvanometer mirror 432 is attenuated by the polytopic filter 429 to be incident upon the PBS 426. The light beam incident upon the PBS 426 is transmitted through the PBS 426 to be incident upon the SLM/CMOS 441.

Further, since the SLM portion and the CMOS sensor portion are integrated, the half wavelength plate 430 for polarization separation is not required in the PBS 426 during recording and reproduction.

Thus, the light beam incident upon the SLM/CMOS 441 is converted into an electric signal by the image receiving function portion of the SLM/CMOS 441, and two-dimensional pattern information corresponding to a desired hologram recorded on the hologram recording medium 422 is reproduced.

Herein, the SLM/CMOS 441 of this embodiment will be described.

Figure 33:
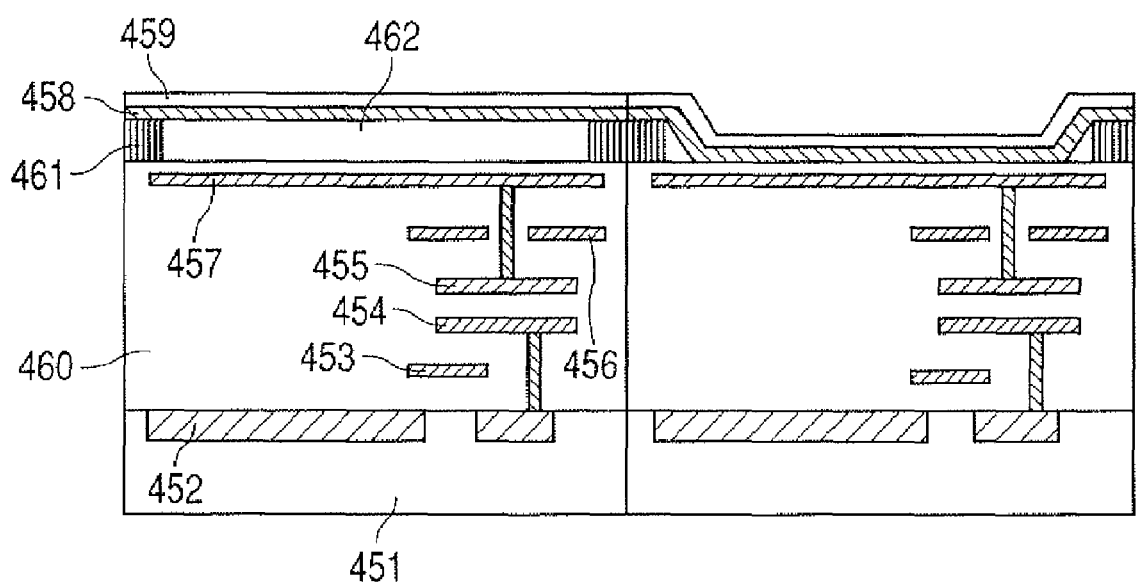
FIG. 33 is a cross-sectional view (schematic view) of one pixel of an SLM/CMOS sensor element according to Embodiment 8.

FIG. 33 is a cross-sectional view (schematic diagram) of one pixel of the SLM/CMOS 441 according to this embodiment.

This embodiment is characterized in that the SLM portion and the CMOS sensor portion are integrated three-dimensionally along an optical axis.

Reference numeral 451 denotes an Si substrate; 452, a photodiode; 453, a transfer transistor of a CMOS sensor; 454, a CMOS sensor wiring; 455, a SLM element wiring; 456, a light-shielding film; 457, a light interference mirror A; 458, a light interference mirror B; 459, an outermost protective film; 460, an interlayer film; and 461, a support. An interlayer insulator, the remaining transistor wiring of the CMOS sensor, and transistor wiring for writing of an SLM are omitted.

In this embodiment, interference is caused between the light interference mirror A 457 and the light interference mirror B 458 to change the space therebetween, whereby the reflectance and the transmittance are changed.

More specifically, a case where the mirrors are set to have a wide gap is used as a high reflectance mode. A case where the mirrors are set to have a narrow gap is used as a high transmittance mode. That is, during recording, the reflected light is subjected to spatial modulation based on recording information of two values, that is, high reflectance in the wide gap and low reflectance in the narrow gap. During reproduction, light is guided to the CMOS sensor portion by setting the SLM portion in a high transmittance mode in a narrow gap, and the information reproducing light is converted into an electric signal in the CMOS sensor portion.

Herein, the SLM/CMOS sensor integrated element 441 is produced in the same semiconductor process by successively forming a CMOS sensor and a transistor on a Si substrate, and thereafter, forming an interlayer film and each wiring.

Thus, the spatial light modulating portion and the image light receiving portion are formed on the same substrate in the same semiconductor process, so high-precision alignment between the spatial light modulator and the image receiving element as in the conventional example is not required. Further, by integrating the spatial light modulating portion with the image light receiving portion, space can be saved as compared with the conventional example in which the spatial light modulator and the image receiving element are provided separately.

Embodiment 9

Next, Embodiment 9 will be described.

The optical path of the optical information recording and reproducing apparatus is the same as that of Embodiment 8. Further, the spatial light modulating portion and the image light receiving portion are formed on the same substrate in the same semiconductor process in the same way as in Embodiment 8.

The difference from Embodiment 8 will be described below.

Figure 34:
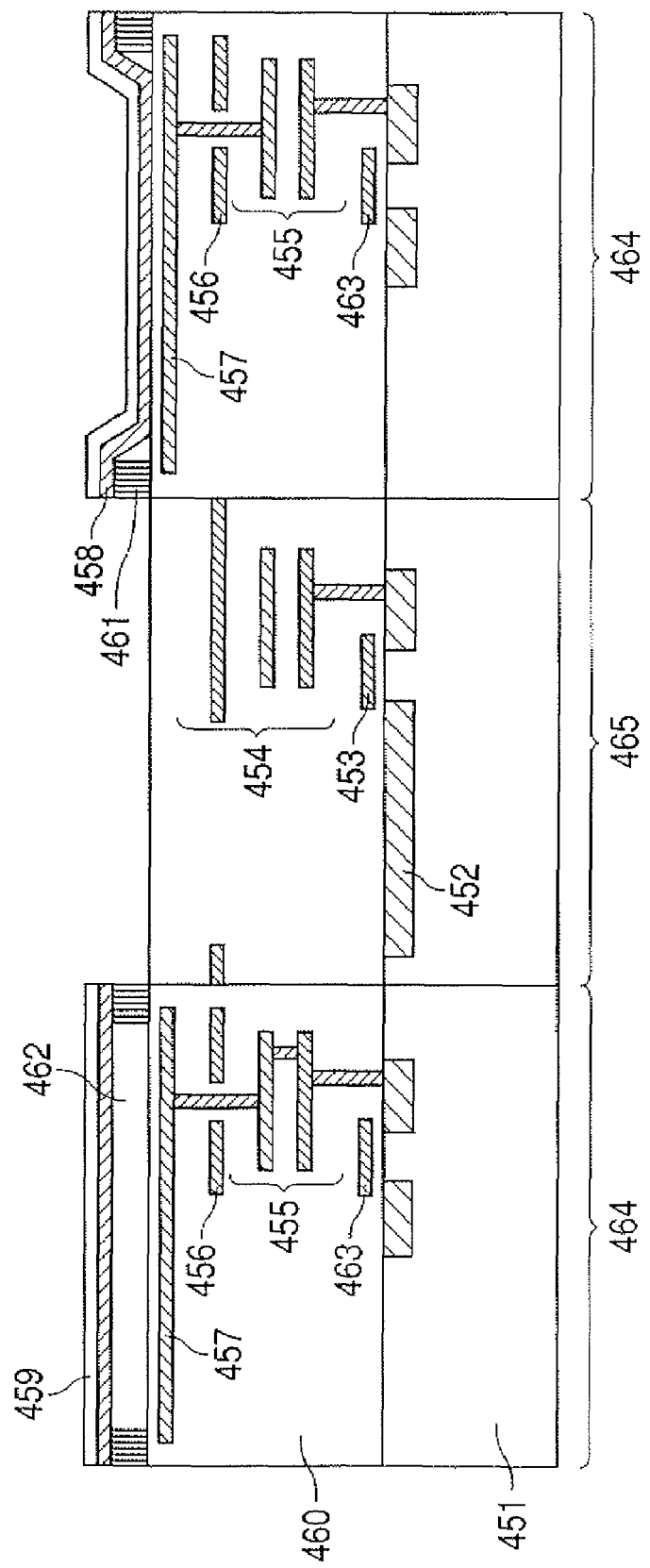
FIG. 34 is a cross-sectional view (schematic view) of an SLM/CMOS sensor element according to Embodiment 9.

In this embodiment, the SLM/CMOS sensor integrated element 441 is a planarly integrated element, in which the SLM portion 464 including the light interference mirror A 457 and the light interference mirror B 458, and the CMOS sensor portion 465 including the photodiode 452 are adjacent to each other along a plane vertical to the optical axis, as shown in FIG. 34.

Figure 35A:
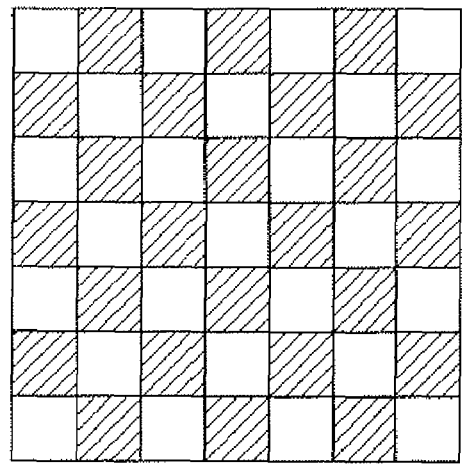
FIGS. 35A, 35B and 35C are diagrams each showing an arrangement example of a spatial light modulating part and an image light receiving part according to Embodiments 9 and 11.
Figure 35B:
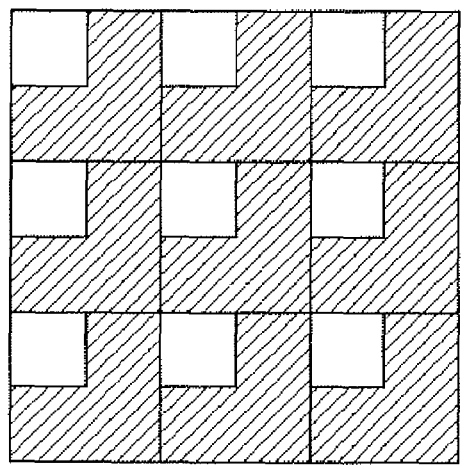
Figure 35C:
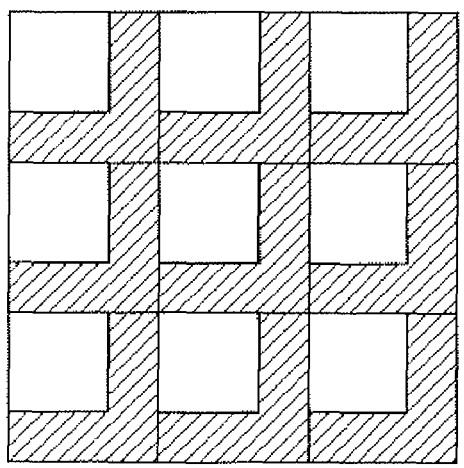

FIGS. 35A to 35C each show an arrangement example of the spatial light modulating portions and the image light receiving portions. The black portions represent image light receiving portions. FIG. 35A shows an example in which the spatial light modulating portions and the image light receiving portions are arranged with the same shape in the same area. FIGS. 35B and 35C show examples in which the image light receiving portions are enlarged to enhance the sensitivity of light reception.

Thus, in the same way as in Embodiment 8, the high-precision alignment of the spatial light modulator and the image photodetector element as in the conventional example is not required. Further, by integrating the spatial light modulating portion with the image light receiving portion, space can be saved as compared with the conventional example in which the spatial light modulator and the image photodetector element are provided separately.

In this embodiment, the transmission mode as in Embodiment 8 is not required as spatial light modulating portion performance. Therefore, it is possible to increase the reflectance of the spatial light modulating portion, which can increase the use ratio of light during recording of information.

Embodiment 10

Embodiment 10 will be described.

Figure 36A:
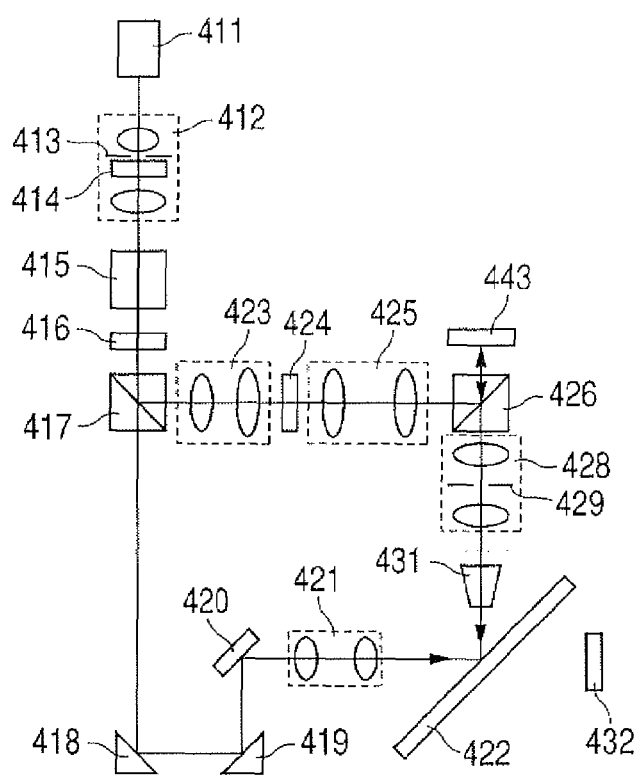
FIGS. 36A and 36B are diagrams each showing an optical path of an optical information recording and reproducing apparatus according to Embodiments 10 and 11.
Figure 36B:
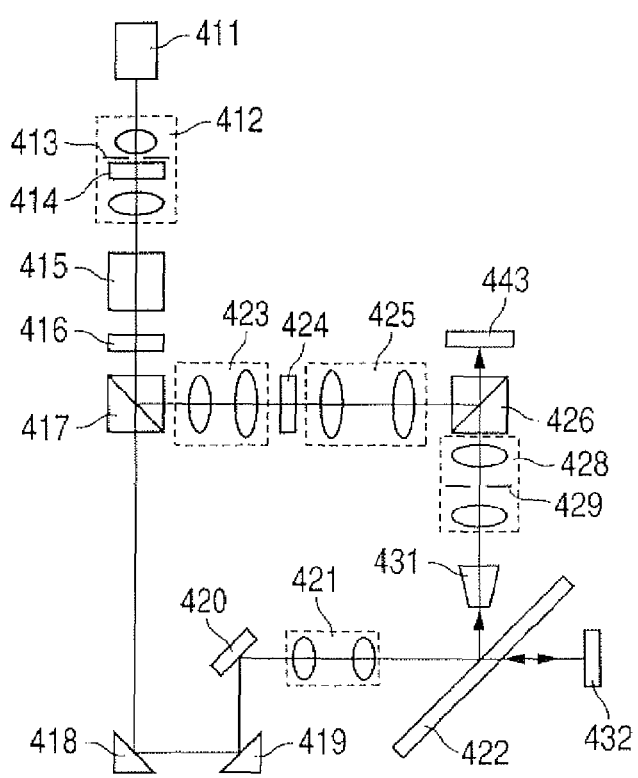

FIGS. 36A and 36B are diagrams each showing an optical path of this embodiment. The difference from Embodiment 8 lies in that the quarter wavelength plate 442 shown in FIGS. 32A and 32B is eliminated by the use of the SLM/CMOS sensor integrated element 443 of a reflection liquid crystal type.

In the same way as in FIGS. 32A and 32B, FIG. 36A show an operation at a time of recording, and FIG. 36B shows that at a time of reproduction.

Figure 37:
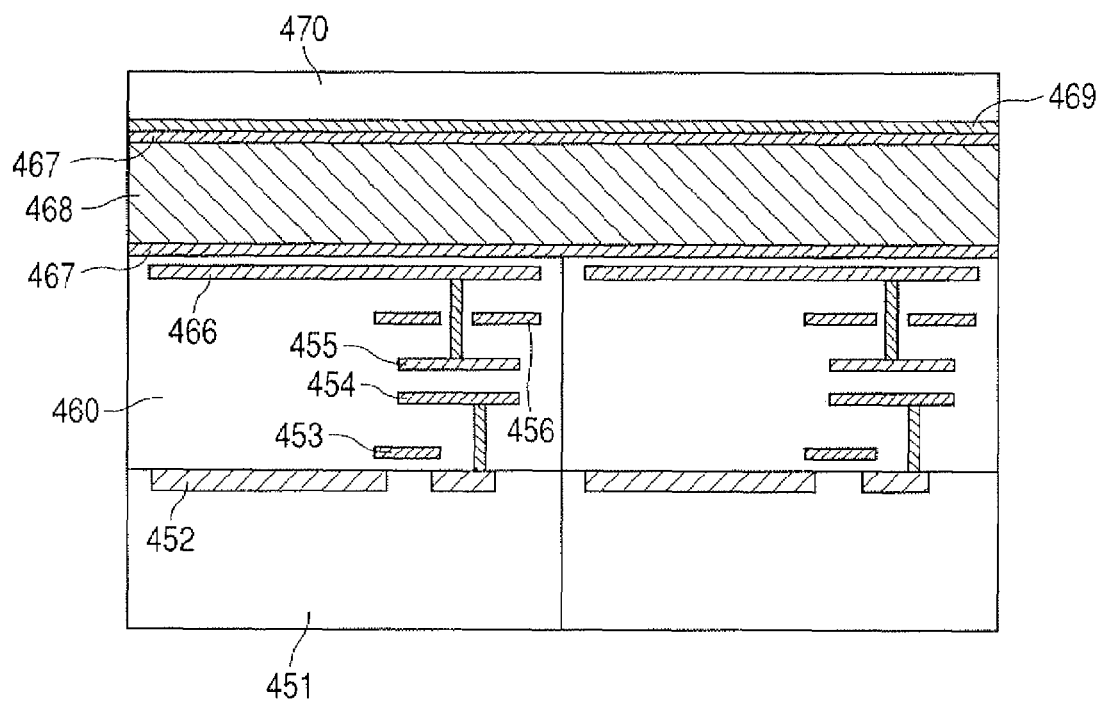
FIG. 37 is a cross-sectional view (schematic view) of one pixel of an integrated SLM/CMOS sensor element according to Embodiment 10.

FIG. 37 is a cross-sectional view (schematic view) of the SLM/CMOS sensor integrated element 443 of a reflection liquid crystal type, in which the spatial light modulating portion and the image light receiving portion are arranged three-dimensionally along an optical axis.

Reference numeral 466 denotes a pixel electrode; 467, an alignment film; 468, a liquid crystal; 469, an ITO; and 470, a glass. The alignment film 467 is a diagonally deposited $SiO_2$ film, the liquid crystal 468 is a vertical liquid crystal, and the pixel electrode 466 is a semi-transparent film having a reflectance of about 50%.

During recording, in a case where the liquid crystal 468 is not supplied with an electric field, light incident upon the liquid crystal 468 is reflected at an intensity of 50% by a pixel electrode without changing the polarization direction. The light beam enters the PBS 426 again, is reflected by the PBS 426 because the polarization is not changed, and does not reach the hologram recording medium 422. In a case where the liquid crystal 468 is supplied with an electric field, the liquid crystal molecules tilt. Since the thickness of the liquid crystal 468 is set so that a phase shift of $\lambda/2$ is caused by going forward and backward in the liquid crystal 468. Therefore, the reflected light by the SLM portion becomes linear polarized light rotated by 90°, and is transmitted through the PBS 426 to reach the hologram recording medium 422.

Thus, the light is subjected to two-dimensional modulation corresponding to predetermined information, and contributes to the recording of information.

On the other hand, in the case of reproduction, the polarized state is not related, so the liquid crystal may have any state.

In the case of this embodiment, the quarter wavelength plate 442 can be eliminated, so an optical system can be simplified as compared with Embodiment 8.

Embodiment 11

Next, Embodiment 11 will be described.

The optical path of the optical information recording and reproducing apparatus is the same as that of Embodiment 10.

The difference from Embodiment 10 will be described below.

Figure 38:
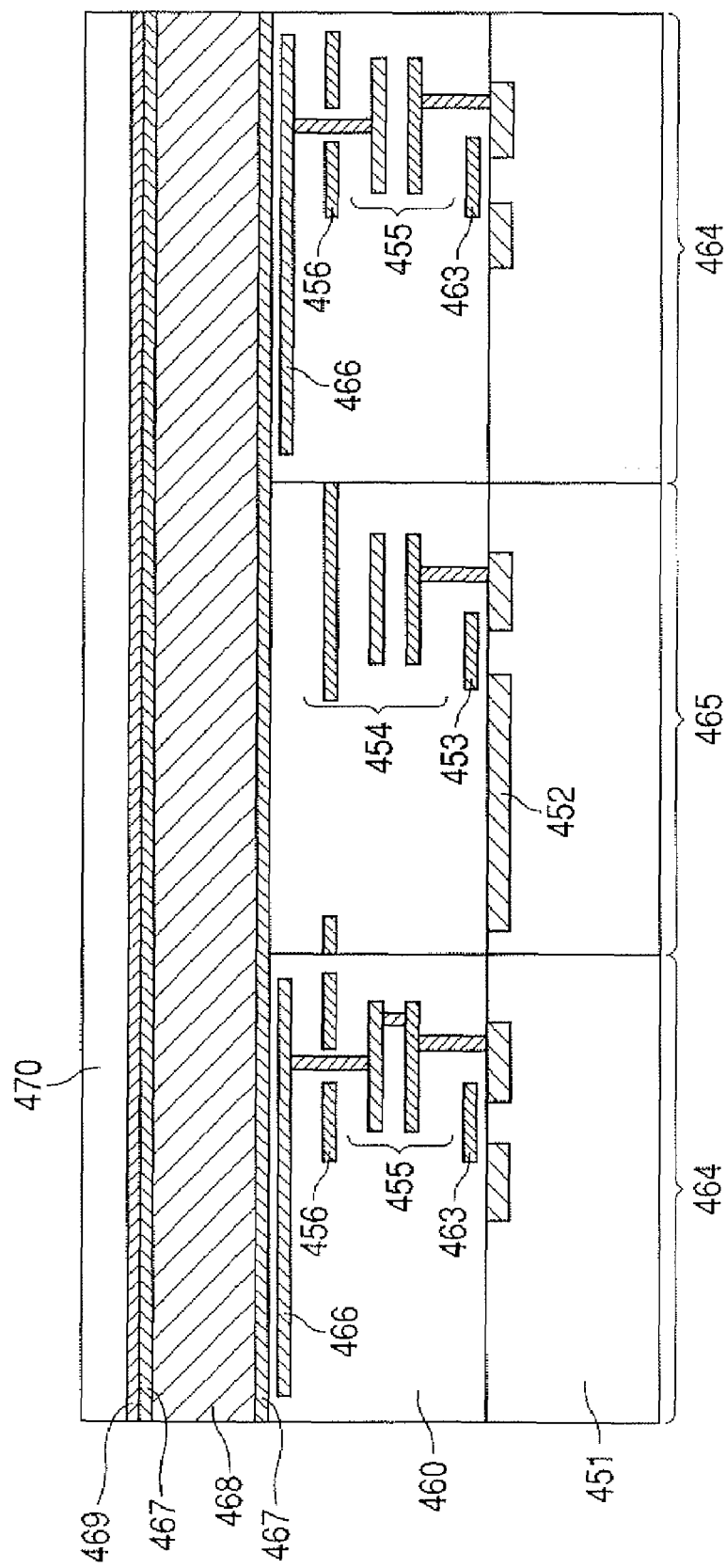
FIG. 38 is a cross-sectional view (schematic view) of an integrated SLM/CMOS sensor element according to Embodiment 11.

In this embodiment, the SLM/CMOS sensor integrated element 443 is a planarly integrated element, in which the SLM portion 464 including the pixel electrode 466, and the CMOS sensor portion 465 including the photodiode 452 are adjacent to each other along a plane vertical to the optical axis, as shown in FIG. 38.

The arrangement of the spatial light modulating portions and the image light receiving portions is the same as that illustrated in FIGS. 35A to 35C.

In this embodiment, as spatial light modulating portion performance, the pixel electrode 466 does not need to be a semi-transparent film unlike Embodiment 10, and the reflectance of the spatial light modulating portion can be enhanced. Further, the transmission loss during reproduction is eliminated, and hence, the use efficiency of light can be enhanced.

As describe above, according to the present invention, a spatial light modulator SLM and a photodetector element CMOS sensor are arranged on the same chip. Therefore, the complicated alignment mechanism thereof and the expensive relay lens system are omitted, whereby cost down and compacting of the optical system can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-343882, filed Nov. 29, 2005, 2005-343884, filed Nov. 29, 2005, 2006-131450, filed May 10, 2006, and 2006-307896, filed Nov. 14, 2006, which are hereby incorporated by reference herein in their entirety.

What is claimed is:

1. An optical information recording and reproducing apparatus for recording information by allowing information light and reference light to interfere with each other and reproducing the information using the reference light, comprising:

a light source;

a spatial light modulator for generating at least an information light with respect to a light beam from the light source;

an objective lens for irradiating a recording medium with the light beam from the spatial light modulator; and a photodetector element for receiving a reproduction light from the recording medium, wherein the spatial light modulator and the photodetector element are formed on a same semiconductor substrate, wherein the light beam from the light source is generated into the information light and the reference light having the same optical axis, based on the spatial light modulator, and wherein a pixel constituting the spatial light modulator and a pixel constituting the photodetector element are arranged alternately in a horizontal direction and a vertical direction on the semiconductor substrate.

2. An optical information recording and reproducing apparatus for recording information by allowing information light and reference light to interfere with each other and reproducing the information using the reference light, comprising:

a light source;

a spatial light modulator for generating at least an information light with respect to a light beam from the light source;

an objective lens for irradiating a recording medium with the light beam from the spatial light modulator;

a photodetector element for receiving a reproduction light from the recording medium, wherein the spatial light modulator and the photodetector element are formed on a same semiconductor substrate, and are arranged coaxially in a light incident direction, wherein the light beam from the light source is generated into the information light and the reference light having the same optical axis, based on the spatial light modulator; and further comprising a mask element provided between the semiconductor substrate and the light source, wherein the mask element transmits the light beam from the light source during recording of information, and blocks a light beam in a portion corresponding to the information light and transmits a light beam in a portion corresponding to the reference light during reproduction of information.

3. An optical information recording and reproducing apparatus according to claim 1, further comprising a mask element provided between the semiconductor substrate and the light source, wherein the mask element transmits the light beam from the light source during recording of information, and blocks a light beam in a portion corresponding to the information light and transmits a light beam in a portion corresponding to the reference light during reproduction of information.

4. An optical information recording and reproducing apparatus according to claim 1, further comprising a drive mechanism for shifting an incident light beam relatively in parallel with respect to the spatial light modulator and the photodetector element between recording and reproduction.

5. An optical information recording and reproducing apparatus according to claim 4, wherein the drive mechanism is placed in a light beam between the light source and the semiconductor substrate, and has a parallel plate for shifting the light beam, wherein the parallel plate is driven so as to be perpendicular or tilted with respect to the light beam.

6. An optical information recording and reproducing apparatus according to claim 4, wherein the drive mechanism drives the semiconductor substrate in a direction perpendicular to the light beam.

7. An optical information recording and reproducing apparatus according to claim 1, further comprising a polarization beam splitter element for guiding the reproduction light to the photodetector element between the semiconductor substrate and the objective lens.

8. An optical information recording and reproducing apparatus according to claim 7, wherein the polarization beam splitter element is configured so as to be integrated with the semiconductor substrate.

9. An optical information recording and reproducing apparatus for recording information by allowing information light and reference light to interfere with each other and reproducing the information using the reference light, comprising:

a light source:

a spatial light modulator for generating at least an information light with respect to a light beam from the light source;

an objective lens for irradiating a recording medium with the light beam from the spatial light modulator;

a photodetector element for receiving a reproduction light from the recording medium, wherein the spatial light modulator and the photodetector element are formed on a same semiconductor substrate; and further comprising a beam splitter element for splitting a light beam from the light source, wherein the information light is generated from one of the split light beams based on the spatial light modulator, and the other of the split light beams is radiated to the recording medium as the reference light in an optical axis different from that of the information light, and wherein a pixel constituting the spatial light modulator and a pixel constituting the photodetector element are arranged alternately in a horizontal direction and a vertical direction on the semiconductor substrate.

10. An optical information recording and reproducing apparatus for recording information by allowing information light and reference light to interfere with each other and reproducing the information using the reference light, comprising:

a light source;

a spatial light modulator for generating at least an information light with respect to a light beam from the light source;

an objective lens for irradiating a recording medium with the light beam from the spatial light modulator;

a photodetector element for receiving a reproduction light from the recording medium, wherein the spatial light modulator and the photodetector element are formed on a same semiconductor substrate; and further comprising a polarization beam splitter element for guiding the reproduction light to the photodetector element between the semiconductor substrate and the objective lens.

11. An optical information recording and reproducing apparatus according to claim 10, wherein the polarization beam splitter element is configured so as to be integrated with the semiconductor substrate.

* * * * *